United States Patent
Sandholm

(10) Patent No.: US 11,102,545 B2
(45) Date of Patent: Aug. 24, 2021

(54) DIGITAL MEDIA CAMPAIGN MANAGEMENT IN DIGITAL MEDIA DELIVERY SYSTEMS

(71) Applicant: Optimized Markets, Inc., Pittsburgh, PA (US)

(72) Inventor: Tuomas W. Sandholm, Pittsburgh, PA (US)

( * ) Notice: Subject to any disclaimer, the term of this patent is extended or adjusted under 35 U.S.C. 154(b) by 605 days.

(21) Appl. No.: 15/814,630

(22) Filed: Nov. 16, 2017

(65) Prior Publication Data

US 2018/0091850 A1    Mar. 29, 2018

Related U.S. Application Data

(63) Continuation-in-part of application No. 15/634,072, filed on Jun. 27, 2017, now Pat. No. 10,097,904, (Continued)

(51) Int. Cl.
*H04N 21/442* (2011.01)
*H04N 21/262* (2011.01)
(Continued)

(52) U.S. Cl.
CPC ......... *H04N 21/442* (2013.01); *H04N 21/252* (2013.01); *H04N 21/262* (2013.01); *H04N 21/2668* (2013.01); *H04N 21/44222* (2013.01); *H04N 21/4583* (2013.01); *H04N 21/4667* (2013.01); *H04N 21/47202* (2013.01); *H04N 21/482* (2013.01); *H04N 21/6582* (2013.01); *H04N 21/812* (2013.01)

(58) Field of Classification Search
CPC combination set(s) only.
See application file for complete search history.

(56) References Cited

U.S. PATENT DOCUMENTS 5,740,549 A    4/1998    Reilly et al.
5,937,390 A    8/1999    Hyodo
(Continued)

FOREIGN PATENT DOCUMENTS

| JP | 200602149 | | 1/2006 |
|---|---|---|---|
| WO | 2006076581 | A2 | 7/2006 |
| WO | 2007092050 | A2 | 8/2007 |

OTHER PUBLICATIONS

Bollaparagda et al., "Managing On-Air Ad Inventory in Broadcast Television", IIE Transactions, 40(12) published online Oct. 2008.
(Continued)

*Primary Examiner* — Alexander Gee
(74) *Attorney, Agent, or Firm* — Fox Rothschild LLP

(57) ABSTRACT

A method and system for managing digital media campaigns accesses a set of programming data that contains various attributes of media assets that a media service provider will present to users. A media advertising campaign manager receives various criteria for the inclusion of advertisements in a particular entity's advertising campaign. The system uses the attributes in the data set to develop an advertising campaign that satisfies the entity's criteria. In various embodiments, the method system may consider the entity's preferences, seller criteria, and campaign requests for other entities.

28 Claims, 10 Drawing Sheets

Related U.S. Application Data which is a continuation of application No. 15/000,742, filed on Jan. 19, 2016, now Pat. No. 9,699,502, and a continuation-in-part of application No. 14/227,413, filed on Mar. 27, 2014.

(60) Provisional application No. 62/104,685, filed on Jan. 16, 2015, provisional application No. 61/805,711, filed on Mar. 27, 2013.

(51) Int. Cl.
| | |
|---|---|
| *H04N 21/458* | (2011.01) |
| *H04N 21/2668* | (2011.01) |
| *H04N 21/658* | (2011.01) |
| *H04N 21/472* | (2011.01) |
| *H04N 21/466* | (2011.01) |
| *H04N 21/25* | (2011.01) |
| *H04N 21/81* | (2011.01) |
| *H04N 21/482* | (2011.01) |

(56) References Cited

U.S. PATENT DOCUMENTS

| | | |
|---|---|---|
| 5,937,392 A | 8/1999 | Alberts |
| 5,999,912 A | 12/1999 | Wodarz et al. |
| 6,009,409 A | 12/1999 | Adler et al. |
| 6,208,982 B1 | 3/2001 | Allen, Jr. et al. |
| 6,253,189 B1 | 6/2001 | Feezell et al. |
| 6,324,519 B1 | 11/2001 | Eldering |
| 6,401,075 B1 | 6/2002 | Mason et al. |
| 6,625,578 B2 | 9/2003 | Spaur et al. |
| 6,654,725 B1 | 11/2003 | Langheinrich et al. |
| 6,876,974 B1 | 4/2005 | Marsh et al. |
| 6,898,572 B2 | 5/2005 | Ohyama |
| 6,907,566 B1 | 6/2005 | McElfresh et al. |
| 7,038,637 B1 | 5/2006 | Eller et al. |
| 7,039,599 B2 | 5/2006 | Merriman et al. |
| 7,054,831 B2 | 5/2006 | Koenig |
| 7,085,732 B2 | 8/2006 | Gould |
| 7,124,091 B1 | 10/2006 | Khoo et al. |
| 7,222,099 B2 | 5/2007 | Forsythe et al. |
| 7,334,251 B2 | 2/2008 | Rodriguez et al. |
| 7,406,434 B1 | 7/2008 | Chang et al. |
| 7,593,905 B2 | 9/2009 | He |
| 7,689,453 B2 | 3/2010 | Ramsey et al. |
| 7,698,178 B2 | 4/2010 | Chu |
| 7,734,503 B2 | 6/2010 | Agarwal et al. |
| 7,831,472 B2 | 11/2010 | Yufik |
| 7,881,959 B2 | 2/2011 | Ramsey et al. |
| 7,949,562 B2 | 5/2011 | Collins |
| 8,131,594 B1* | 3/2012 | Yehoshua ........... G06Q 30/0255 705/14.53 |
| 8,170,913 B1 | 5/2012 | Baluja |
| 8,185,421 B2 | 5/2012 | Fertig et al. |
| 8,190,460 B1 | 5/2012 | Andersen et al. |
| 8,229,870 B2 | 7/2012 | Bagley et al. |
| 8,238,540 B1* | 8/2012 | Duva ....................... H04M 3/51 379/265.01 |
| 8,249,930 B2 | 8/2012 | Badger et al. |
| 8,255,949 B1* | 8/2012 | Bayer ................ H04N 21/2547 725/35 |
| 8,285,577 B1 | 10/2012 | Galperin et al. |
| 8,311,884 B2 | 11/2012 | Yang |
| 8,311,886 B2 | 11/2012 | Vijay et al. |
| 8,332,268 B2 | 12/2012 | Carruthers et al. |
| 8,352,981 B1 | 1/2013 | Oztaskent |
| 8,364,541 B2 | 1/2013 | Roth |
| 8,364,616 B2 | 1/2013 | Bhatnagar |
| 8,374,912 B2 | 2/2013 | Paroz et al. |
| 8,423,407 B2 | 4/2013 | Schepers et al. |
| 8,434,104 B2 | 4/2013 | Weihs et al. |
| 8,478,643 B1 | 7/2013 | Koningstein |
| 8,478,644 B1 | 7/2013 | Baluja |
| 8,489,460 B2 | 7/2013 | Kamath |
| 8,503,635 B2 | 8/2013 | Metz et al. |
| 8,515,814 B2 | 8/2013 | Boutilier et al. |
| 8,516,515 B2 | 8/2013 | Zigmond et al. |
| 8,533,044 B2 | 9/2013 | Oren et al. |
| 8,544,036 B2 | 9/2013 | Bollapragada et al. |
| 8,583,484 B1 | 11/2013 | Chalawsky et al. |
| 8,595,046 B1 | 11/2013 | Christian |
| 8,595,071 B2 | 11/2013 | Veach |
| 8,615,436 B2 | 12/2013 | Stukenborg et al. |
| 8,620,745 B2 | 12/2013 | You et al. |
| 8,620,752 B2 | 12/2013 | Feldman et al. |
| 8,635,110 B2 | 1/2014 | Thierer et al. |
| 8,645,205 B2 | 2/2014 | Nag et al. |
| 8,666,796 B2 | 3/2014 | Balseiro et al. |
| 8,666,807 B1 | 3/2014 | Murray et al. |
| 8,666,813 B2 | 3/2014 | Gonen et al. |
| 8,676,619 B2 | 3/2014 | Lotvin et al. |
| 8,676,650 B1 | 3/2014 | Jurca |
| 8,682,720 B1 | 3/2014 | Wills et al. |
| 8,694,349 B2 | 4/2014 | Lean et al. |
| 8,700,471 B2 | 4/2014 | Schupp et al. |
| 8,702,607 B2 | 4/2014 | LeBoeuf et al. |
| 8,706,548 B1 | 4/2014 | Blume et al. |
| 8,719,089 B1 | 5/2014 | Kent |
| 8,719,096 B2 | 5/2014 | Selvaraj et al. |
| 8,739,204 B1 | 5/2014 | Evans et al. |
| 8,751,302 B2 | 6/2014 | Subramanian et al. |
| 8,751,425 B2 | 6/2014 | Bagley et al. |
| 8,756,104 B2 | 6/2014 | Lynn |
| 8,762,199 B2 | 6/2014 | Schwartz et al. |
| 8,768,772 B2 | 7/2014 | Schachter et al. |
| 8,781,875 B2 | 7/2014 | Chatter et al. |
| 8,782,683 B2 | 7/2014 | Balakrishnan et al. |
| 8,788,334 B2 | 7/2014 | Rose et al. |
| 8,788,337 B2 | 7/2014 | LeBlanc et al. |
| 8,788,343 B2 | 7/2014 | Burdick et al. |
| 2002/0169659 A1 | 11/2002 | Bollapragada et al. |
| 2003/0066070 A1* | 4/2003 | Houston ................ H04H 60/45 725/9 |
| 2003/0101449 A1 | 5/2003 | Bentolila et al. |
| 2004/0210929 A1 | 10/2004 | Bollapragada et al. |
| 2006/0026061 A1 | 2/2006 | Collins |
| 2006/0253323 A1 | 11/2006 | Phan et al. |
| 2007/0157245 A1 | 7/2007 | Collins |
| 2007/0239533 A1 | 10/2007 | Wojcicki et al. |
| 2008/0004948 A1 | 1/2008 | Flake et al. |
| 2008/0021791 A1* | 1/2008 | Steelberg ........... G06Q 30/0267 705/14.68 |
| 2008/0065479 A1 | 3/2008 | Tomlin et al. |
| 2008/0243601 A1 | 10/2008 | Patel et al. |
| 2008/0262917 A1 | 10/2008 | Green et al. |
| 2009/0099904 A1 | 4/2009 | Affeld et al. |
| 2009/0165044 A1 | 6/2009 | Collet et al. |
| 2009/0210287 A1 | 8/2009 | Chickering et al. |
| 2009/0248478 A1 | 10/2009 | Duggal et al. |
| 2010/0017298 A1 | 1/2010 | Stukenborg et al. |
| 2010/0036718 A1 | 2/2010 | Hamilton, II et al. |
| 2010/0082401 A1 | 4/2010 | Vee et al. |
| 2010/0100414 A1 | 4/2010 | Lin et al. |
| 2010/0198694 A1 | 8/2010 | Muthukrishnan |
| 2010/0198695 A1 | 8/2010 | Muthukrishnan et al. |
| 2010/0257054 A1 | 10/2010 | Martin et al. |
| 2010/0262498 A1* | 10/2010 | Nolet ................. G06Q 30/0276 705/14.71 |
| 2010/0318432 A1 | 12/2010 | Zinkevich et al. |
| 2011/0004522 A1 | 1/2011 | Lee |
| 2011/0029373 A1* | 2/2011 | Steelberg ............... G06Q 30/02 705/14.41 |
| 2011/0047026 A1* | 2/2011 | Biggs ..................... G06Q 30/02 705/14.46 |
| 2011/0112900 A1 | 5/2011 | Sanghavi |
| 2011/0238486 A1 | 9/2011 | Liu et al. |
| 2011/0246312 A1 | 10/2011 | Meek et al. |
| 2011/0295678 A1* | 12/2011 | Seldin ................ G06Q 30/0256 705/14.42 |
| 2011/0314495 A1* | 12/2011 | Zenor ............... H04N 21/25883 725/34 |
| 2012/0036023 A1 | 2/2012 | Das et al. |
| 2012/0042338 A1 | 2/2012 | Kitts et al. |

(56) References Cited

U.S. PATENT DOCUMENTS

| | | | |
|---|---|---|---|
| 2012/0203623 A1 | 8/2012 | Sethi et al. | |
| 2012/0215903 A1 | 8/2012 | Fleischman et al. | |
| 2012/0303464 A1 | 11/2012 | Gorman et al. | |
| 2013/0060628 A1 | 3/2013 | Catrambone | |
| 2013/0097629 A1 | 4/2013 | Popescu et al. | |
| 2013/0325585 A1 | 12/2013 | Amit et al. | |
| 2013/0325589 A1 | 12/2013 | Jordan | |
| 2014/0058827 A1 | 2/2014 | Svirsky et al. | |
| 2014/0074627 A1* | 3/2014 | Kucharz | G06Q 30/02 705/14.72 |
| 2014/0109123 A1* | 4/2014 | Balakrishnan | H04N 21/252 725/14 |
| 2014/0149232 A1 | 5/2014 | Ringdahl | |
| 2014/0297400 A1 | 10/2014 | Sandholm | |

OTHER PUBLICATIONS

Balakrishnan et al., "Computational Television Advertising", Data Mining (ICDM), 2012 IEEE 12th International Conference on IEEE, 2012.

Gaur et al., "Conflict Resolution in the Scheduling of Television Commercials", Operations Research, INFORMS, vol. 57, No. 5, Sep.-Oct. 2009, pp. 1098-1105.

Gal-Or et al., "Customized Advertising via a Common Media Distributor", Marketing Science, INFORMS, vol. 24, No. 2, Spring 2005, pp. 241-253.

Nisan et al., "Google's Auction for TV Ads", ICALP 2009 Proceedings of the 36th International Collogquium on Automata, Part II, LNCS 5556, Rhodes, Greece—Jul. 5-12, 2009, pp. 309-327.

Nisan et al., "Google's Auction for TV Ads, Preliminary version".

Jones et al., "A Heuristic for Winner Determination in Rule-Based Combinatorial Auctions", INFORMS Journal on Computing, vol. 17, No. 4, Fall 2005, pp. 475-489.

Turner et al., "Scheduling of Dynamic In-Game Advertising", Operations Research, INFORMS, vol. 59, No. 1, Jan.-Feb. 2011, pp. 1-16.

Turner et al., "The Planning of Guaranteed Targeted Display Advertising", Operations Research, INFORMS, vol. 60, No. 1, Jan.-Feb. 2012, pp. 18-33.

Turner, "Extended Abstract: New Media Planning Models for New Media".

Jones, "Incompletely Specified Combinatorial Auction: An Alternative Allocation Mechanism for Business-to-Business Negotiations", a Dissertation presented to the Graduate School of the University of Florida 2000.

Jones et al., "Combinatorial auctions using rule-based bids", Elsevier Science B.V., Decision Support Systems 34 (2002) 59-74, accepted Dec. 1, 2001.

Adany et al., "Personal Advertisement Allocation for Mobile TV", Proceedings of MoMM2009, Dec. 14-16, 2009, Kuala Lumpur, Malaysia.

Jones et al., "Market Segmentation Within Consolidated E-Markets: A Generalized Combinatorial Auction Approach", Journal of Management Information Systems, Summer 2006, vol. 23, No. 1, pp. 161-182, downloaded on Mar. 22, 2014.

Mihiotis et al., "A mathematical progamming study of advertising allocation problem", Elsevier, Applied Mathematics and Computation 148 (2004) 373-379.

Gal-Or et al., "Minimum Differentiation in Commercial Media Markets", Journal of Economics & Management Strategy, vol. 12, No. 3, Feb. 2003, pp. 291-325.

Bollapragada et al., "NBC's Optimization Systems Increase Revenues and Productivity", Interfaces, INFORMS, vol. 32, No. 1, Jan.-Feb. 2002, pp. 47-60.

Dukes et al., "Negotiations and Exclusivity Contracts for Advertising", Marketing Science, INFORMS, vol. 22, No. 2, Spring 2003, pp. 222-245; published online May 1, 2003.

Rust et al., "A Programming and Positioning Strategy for Cable Television Networks", Journal of Advertising, vol. 17, No. 4, 1988, pp. 6-13.

Bollapragada et al., "Scheduling Commercials on Broadcast Television", Operations Research, INFORMS, vol. 52, No. 3, May-Jun. 2004, pp. 337-345.

Reddy et al., "SPOT: Scheduling Programs Optimally for Television", Management Science, vol. 44, No. 1, Jan. 1998, pp. 83-102.

Bollapragada et al., "Scheduling Commercial Videotapes in Broadcast Television", Operations Research, INFORMS, vol. 52, No. 5, Sep.-Oct. 2004, pp. 679-689.

Gal-Or et al., "Targeted Advertising Strategies on Television", Management Science, INFORMS, vol. 52, No. 5, May 2006, pp. 713-725.

Zhang, "Mathematical models for the television advertising allocation problem", Int. J. Operational Research, vol. 1, No. 3, 2006, pp. 302-322.

Msi-jp, "The basics of Xpress-MP", Chapter 5, retrieved May 9, 2017, on line at msi-jp.com/express/learning/square/chaper5-en.pdf.

* cited by examiner

200

CAMPAIGN CONTROLS

Name of Campaign [ ] — 201

Start Campaign [ 03/01/2013 12:00 ▼ ] — 202

End Campaign [ 03/01/2013 12:00 ▼ ] — 203

SMOOTHNESS

Maximum change [ 15 ]% per [ [time unit] ▼ ] — 204

EXCLUSIVITY — 205

Description [ Avoid ▼ ] [ Other fast food restaurants ▼ ] in [ Same program ▼ ]

Place with
- McDonald's
- Yum Brands

- Same commercial break
- 20 minute window
- 30 minute window

206

Preference strength — Requirement [ ]

Preference [ X ]   Value added if preference is honored? [ % _____ ]

207

BUDGET [ $ _____ ]

SELECT CAMPAIGN

701

| Name | Buyer | Budget |
|---|---|---|
| Campaign 1 | Company X | 23000.00 |
| Campaign 2 | Company Y | 25000.00 |

SCHEDULE DISTRIBUTION

702

| | 10:00 AM – 2:00 PM | 2:00 PM – 5:00 PM | 5:00 PM – 8:00 PM | 8:00 PM – 11:00 PM |
|---|---|---|---|---|
| Campaign 1 | 10% | 0 | 60% | 40% |
| Campaign 2 | 30% | 20% | 40% | 10% |

703

| Program Name | Buyer | Budget |
|---|---|---|
| Show 1 | Company X | 5000.00 |
| Show 2 | Company Y | 3000.00 |

FIG. 7

DIGITAL MEDIA CAMPAIGN MANAGEMENT IN DIGITAL MEDIA DELIVERY SYSTEMS

RELATED APPLICATIONS AND CLAIM OF PRIORITY

This patent document claims priority to, and is a continuation-in-part of, U.S. patent application Ser. No. 15/634,072, filed Aug. 24, 2017 (the '072 Application). The '072 Application is a continuation of U.S. patent application Ser. No. 15/000,742, filed Jan. 19, 2016, now U.S. Pat. No. 9,699,502, issued Jul. 4, 2017, and which in turn claims priority to U.S. Provisional Patent Application No. 62/104,685, filed Jan. 16, 2015.

This patent document also claims priority to, and is a continuation-in-part of, U.S. patent application Ser. No. 14/227,413, which was filed Mar. 27, 2014 and which in turn claims priority to U.S. Provisional Patent Application No. 61/805,711, filed Mar. 27, 2013.

The disclosures of each priority patent application listed above are fully incorporated into this document by reference.

BACKGROUND

Current methods of implementing digital media campaigns on television, radio and other media outlets are very inefficient. For example, television ad sales often involve manual negotiation. However, the people who manage the ad campaign typically do not have access to scheduling information. Often, a transaction to use one or more media assets in a campaign is completed, but the representative later finds that the campaign cannot be scheduled as planned, either due to broadcast schedule changes or because other representatives have sold different advertising campaigns that cannot be mapped onto the inventory together with the campaign in question. In cases such as this, the representative must provide the customer with makegoods (e.g., free digital ad inventory from the future), resulting in wasted work time and effort for the representative and lost revenue opportunities for the media outlet.

In addition, current methods of offering digital media ad campaigns often involve criteria (such as purchase prices) that are set by the digital media outlet or other seller. They do not adequately account for what programs, times, or other parameters may be of most value to each individual consumer. In cases such as this, the offering entity may be losing opportunities for additional revenues from a consumer.

Further, current methods lack efficient mechanisms to manage cross-media advertising campaigns. Scheduled digital media ads across broadcast television, cable television, radio and streaming media outlets can involve very different data sets, parameters and values. Representatives must manually gather and monitor data from multiple systems to determine what packages to offer to a potential consumer. Consumers face exposure problems in crafting together cross-media campaigns from multiple sources because they have to commit at some sources before knowing whether they will get what they want from the other sources.

This document describes methods and systems to address some or all of the issues described above, as well as other shortcomings in current digital media campaign sales and scheduling systems.

SUMMARY

In various embodiments, a system for managing a digital media campaign, includes a first data store holding various digital media files, each of which corresponds to a digital advertisement that an electronic media service provider may present to consumers. The system also includes a second data store containing an inventory of digital programming files, each of which corresponds to one or more digital programming assets. The system also includes programming data comprising temporal attributes and non-temporal attributes for some or all of the digital programming files. A digital media server is configured to access the first data store and transmit the digital programming files to a plurality of media presentation device. The system also includes a processor, along with a computer-readable medium containing programming instructions that, when executed, cause the processor to implement a digital media campaign manager. The digital media campaign manager will cause an electronic device to implement a buyer-side user interface that displays a sections that provide input fields for user-selectable purchasing criteria for placement of digital advertisements in one or more of the digital programming assets. The system will receive, via one or more of the input fields of the buyer-side user interface, a selection of one or more of the purchasing criteria for a purchase of digital advertisements by a first buyer. The campaign manager also will cause a display device to present a seller-side user interface that comprises sections that provide input fields for by which a seller may enter seller-side criteria for placement of digital advertisements in one or more of the digital programming assets. The system will receive, via the input fields of the seller-side user interface, a selection of one or more of the seller-side criteria for placement of digital advertisements in one or more of the digital programming assets. The system will compare the purchasing criteria and the seller-side criteria to the temporal attributes and non-temporal attributes in the data set to automatically develop an advertising campaign for the first buyer by selecting a group of the digital programming assets and automatically allocating the selected group of digital programming assets to the advertising campaign, along with scheduling parameters indicating when the digital advertisements will run within the digital programming assets in the group, so that the advertising campaign satisfies the selected purchasing criteria and the selected seller-side criteria. The campaign manager will cause either the buyer-side user interface or the seller-side user interface to present indicia of the advertising campaign to either the first buyer or the seller to review. After acceptance of the advertising campaign by either the first buyer or the seller, the system will cause the digital media server to transmit the selected group of digital programming assets to media presentation devices with the digital media files that will run according to the scheduling parameters.

Optionally, the instructions to present the buyer-side user interface that displays user-selectable purchasing criteria will include instructions to enable the first buyer to identify a start time, end time or duration for the advertising campaign, along with instructions to enable the first buyer to identify a budget constraint for the advertising campaign. In addition, the instructions to implement the digital media campaign manager may include instructions to develop the advertising campaign so that it satisfies the budget constraint and the identified start time, end time or duration.

Optionally, the instructions to present the buyer-side user interface that displays user-selectable purchasing criteria may include instructions to enable the user to (i) identify a monetary value that the first buyer will pay if at least a portion of the selected purchasing criteria are met; (ii) identify one or more alternative criteria for the campaign; and (iii) identify one or more different monetary values that the first buyer will pay if any of the alternative criteria are met. If so, the instructions to present the buyer-side user interface may include instructions to enable the first buyer to identify the different monetary values by expressing preferences over targeting, campaign control criteria or both. Alternatively, at least one of the alternative criteria may include an exclusivity preference that comprises an exclusive time period and a competitive restriction for the placement of advertisements by a second buyer in one or more of the digital programming assets during the exclusive time period. If so, then the instructions to automatically develop the advertising campaign may include instructions to use the different monetary value for the exclusivity preference to determine whether satisfying the exclusivity preference will maximize a revenue opportunity for the media service provider, and if satisfying the exclusivity preference will maximize a revenue opportunity for media service provider then develop an advertising campaign for the second buyer so that digital media assets of the second buyer are positioned in a manner that does not violate the exclusivity preference of the first buyer.

Optionally, the received selection of one or more of the purchasing criteria may include a target audience criterion that comprises at least one of the following: (i) a requirement that a viewer have purchased a specified good or service within a time period; (ii) a requirement that a viewer have exhibited a viewing pattern over a time period; (iii) a requirement that a viewer has publicly expressed positive feedback on a social network for a digital media asset in the advertising campaign; or (iv) a requirement that a viewer has not publicly expressed negative feedback on a social network for a digital media asset in the advertising campaign.

Optionally, the instructions to present the buyer-side user interface may include instructions to enable the user to use the interface to identify an overall time period for the advertising campaign, define a time unit that is a subunit of the overall time period and identify a smoothness criterion that represents a measurement of a maximum amount of (or a maximum change in a volume of) advertisements allocated to each of the time units for the advertising campaign. The instructions to automatically develop the advertising campaign may include instructions to select a group of advertisements for the campaign and automatically allocate the advertisements to spots in the campaign so that any advertisements placed in digital programming assets that are scheduled television programs are allocated to the time units in a manner that does not violate the smoothness criterion.

Optionally, the instructions to present the buyer-side user interface may include instructions to cause the interface to enable the user to identify a separation criterion that comprises a user-specified type of advertisement and a minimum distance that the advertising campaign should maintain between placement of the first buyer's advertisements and placement of advertisements of the user-specified type. The instructions to automatically develop the advertising campaign may include instructions to select a group of advertisements for the first buyer for the campaign and automatically allocate the first buyer's advertisements to spots in the campaign so that the first buyer's advertisements and placement of advertisements of the user-specified type are positioned in a manner that does not violate the separation criterion.

Optionally, the instructions to cause the display device to present the seller-side user interface may include instructions to provide an input by which the seller-side user interface may receive from a user: (i) a categorization of at least one of the purchasing criteria as a preference; and (ii) for at least one of the criteria that is categorized as a preference, a plurality of levels for the preference criterion and, for each level, a level-specific bonus amount that the first buyer will pay if the preference is satisfied in the advertising campaign.

Optionally, the instructions to present the seller-side user interface may include instructions to provide an input by which the seller-side user interface may receive from a user: (i) a categorization of two or more of the purchasing criteria as preferences, and (ii) for each of the criteria that are categorized as a preference, a bonus amount that the first buyer will pay if the preference is satisfied in the advertising campaign. The instructions to automatically develop the advertising campaign may then include instructions to develop the advertising campaign to satisfy at least one of the preferences that maximize a revenue opportunity for the media service provider. In this situation, the instructions to present the seller-side user interface also may include instructions to provide an input by which the seller-side user interface may receive from a user a constraint on how the bonus amounts may be aggregated. In addition, the instructions to automatically develop the advertising campaign may include instructions to determine a cost for the advertising campaign that includes the bonus amounts as limited by the constraint.

Optionally, the instructions to implement the digital media advertising campaign manager also may include instructions to receive a group of zones that constitute an interconnect for at least a portion of the advertising campaign. In addition, the instructions to automatically develop the advertising campaign may include instructions to develop the portion of the advertising campaign so that whenever a slot is allocated to an interconnect, then present an ad running in that slot to all zones that constitute the interconnect.

Optionally, the instructions to implement the buyer-side user interface may include instructions to access a set of profile data for the first buyer. For at least one of the purchasing criteria, the system determine a recommended value for that purchasing criteria for the first buyer based on the profile data. The system may then include the recommended value in the campaign as a default value.

Optionally, the instructions to develop the advertising campaign may include instructions to identify advertisements to include in the advertising campaign. For each of the advertisements, the system may preliminarily assign the advertisement to a position in the advertising campaign, wherein the position comprises at least one of the following: a media asset or a temporal position. The system may present the advertising campaign to the first buyer with at least one advertising assignment presented as an unscheduled commitment for which the position will be assigned or confirmed after the first buyer accepts the advertising campaign. In addition, the instructions to assign each advertisement to a position may include instructions to: (i) determine that multiple candidate positions have attributes that meet each constraint in the first buyer's purchasing criteria; (ii) select, from the candidate positions, a group of position assignments that maximize a revenue opportunity for the media service provider while remaining within the budget criteria; and (iii) include the group of media assets and position assignments in the advertising campaign.

Optionally, the instructions to cause the electronic device to implement the buyer-side user interface may include instructions to provide an input by which the buyer-side user interface may receive from the first buyer a selection of at least one preferred slot within a pod of programming, along with a monetary value that the first buyer will pay if the campaign includes an advertisement in the preferred slot. The instructions to implement the advertising campaign comprise instructions to: (i) identify a plurality of advertisements to include in the advertising campaign; (ii) determine whether assigning an advertisement to the preferred slot will maximize a revenue opportunity for the media service provider, and (iii) when assigning an advertisement to the preferred slot will maximize a revenue opportunity for the media service provider, assigning an advertisement to a position that corresponds to the preferred slot.

Optionally, the instructions to develop the advertising campaign also may include additional instructions to: (i) receive a second set of purchasing criteria for a purchase of advertisements by a second buyer; (iii) use the second set of purchasing criteria and at least some of the attributes in the set of programming data to develop a second advertising campaign for the second buyer; (iii) determine that the first advertising campaign and the second advertising campaign would, if implemented, each place an advertisement in a common position; (iv) determine whether placing the advertisement from the first advertising campaign in the common position or placing the advertisement from the second advertising campaign in the common position will maximize a revenue opportunity for the media service provider; and (v) place the advertisement from the advertising campaign that will maximize the revenue opportunity in the common position, and modify the other advertising campaign to identify a new position for the other advertising campaign's advertisement such that the new position will satisfy the purchasing criteria for the buyer of the other advertising campaign. The instructions to develop the first and second advertising campaigns also may include additional instructions to reoptimize an allocation of inventory to each campaign in light of a new campaign request, a change in supply of inventory, or a change in demand projections.

Optionally, the instructions may further include instructions that, when executed, cause the processor to, after the advertisement campaign has begun: (i) determine that the media service provider was, or likely will be, unable to satisfy a purchasing criterion that was classified as a constraint; (ii) identify a make-good action that has a value that is appropriate to compensate the first buyer for the media service provider's inability to satisfy the purchasing criterion that was classified as a constraint; and (iii) automatically cause the make-good action to be offered or given to the first buyer or to a representative of the media service provider.

Optionally, the instructions to develop the advertising campaign instructions may include instructions to identify advertisements to include in the advertising campaign, and assign the advertisements to positions in digital programming assets that comprise at least two of the following: a television program, an on-demand program that is distributed via an online audio/video distribution service, an electronic game; an electronic publication, or a web page.

Optionally, the system also may include instructions to, after presenting the indicia of the advertising campaign: (i) receive a response comprising an acceptance of a first portion of the advertising campaign and a rejection of a second portion of the advertising campaign; (ii) determine an updated price for the first portion of the advertising campaign; (iii) modify the advertising campaign to exclude the second portion of the advertising campaign; and (iv) output the modified advertising campaign and the updated price via the buyer-side user interface and/or the seller-side user interface for review.

Optionally, the instructions to develop the advertising campaign also may include instructions to: (i) identify an alternate criterion that comprises an alternative or supplement to at least one of the purchasing criteria; (ii) use the temporal attributes and the non-temporal attributes in the data set to automatically develop an alternative advertising campaign for the first buyer that satisfies the purchasing criteria as modified by the alternate criterion; and (iii) present the alternative advertising campaign to the first buyer via the buyer-side user interface and/or the seller via the seller-side user interface.

Optionally, the instructions to develop the advertising campaign may include additional instructions to identify an undersell constraint that comprises a restriction on sale of advertisements for a particular media asset or other unit of inventory. If so, the when automatically developing the advertising campaign the system may do so such that the advertising campaign satisfies the undersell constraint.

The instructions to develop the advertising campaign also may include instructions to relax a supply constraint throughout a campaign on a per-inventory-segment basis, and also to reoptimize one or more campaigns based on the relaxing.

Optionally, the system may include additional programming instructions that cause the processor to provide a property manager configured to receive temporal attributes, non-temporal attributes or both for a new media asset. If so, the system may add the received attributes for the new media asset to the set of programming data for use in future advertising campaigns.

Optionally, the seller-side criteria may include one or more of the following: (i) a premium value to be added to a bid or budget received from the first buyer; (ii) a requirement to provide the first buyer with an audience having one or more specified attributes; or (iii) a rule to factor a make-good cost in a revenue analysis when developing the advertising campaign.

Optionally, the instructions to implement the digital media campaign manager also include instructions to cause a processor to receive a modification of the advertising campaign, and also to cause a processor to modify the advertising campaign to implement the received modification.

Optionally, the system may include a set of additional programming data comprising temporal attributes and non-temporal attributes for a plurality of digital media assets that a second media service provider will present to consumers. If so, the instructions to develop the advertising campaign may include instructions to also use the parameters in the data set for the second media service provider so that the advertising campaign allocates advertisements to media assets for each of the media service providers.

Optionally, the system may include additional programming instructions to: (i) determine a first cost to reach a target audience using a first type of targeting for the placement of the digital programming advertisements in one or more of the digital programming assets; (ii) determine a second cost to reach the target audience using a second type of targeting, wherein the second type of targeting is broader or narrower than the first type of targeting; and (iii) cause the seller-side user interface or the buyer-side user interface to output the first and second costs for comparison.

In another embodiment, a system for managing a digital media campaign, includes a data store containing an inventory of digital programming files, each of which corresponds to one or more digital programming assets. The system also includes a set of programming data comprising temporal attributes and non-temporal attributes for some or all of the digital programming files. The system also includes a digital media server configured to access the first data store and transmit the digital programming files to media presentation devices. The system also includes a processor and a computer-readable medium containing programming instructions that, when executed, cause the processor to implement a digital media campaign manager. The digital media campaign manager will cause an electronic device to implement a buyer-side user interface that displays sections that provide input fields for user-selectable purchasing criteria for placement of digital advertisements in one or more of the digital programming assets. The system will receive, via one or more of the input fields of the buyer-side user interface, a selection of one or more of the purchasing criteria for a purchase of digital advertisements by a first buyer. The system will cause a display device to present a seller-side user interface that includes sections that provide input fields by which a seller may enter seller-side criteria for placement of digital advertisements in one or more of the digital programming assets. The system will receive, via the input fields of the seller-side user interface, a selection of one or more of the seller-side criteria for placement of digital advertisements in one or more of the digital programming assets. The system will compare the purchasing criteria and the seller-side criteria to the temporal attributes and non-temporal attributes in the data set to develop an advertising campaign for the first buyer by selecting a group of the digital programming assets and automatically allocating the selected group of digital programming assets to the advertising campaign, along with scheduling parameters indicating when the digital advertisements will run within the digital programming assets in the group, so that the advertising campaign satisfies the selected purchasing criteria and the selected seller-side criteria. The system will cause either the buyer-side user interface or the seller-side user interface to present indicia of the advertising campaign to either the first buyer the seller to review. After acceptance of the advertising campaign by either the first buyer or the seller, the system will generate a campaign file or a scheduling file containing programming instructions and parameters for the advertising campaign that are callable by an application programming interface or usable by a digital advertising insertion system to place digital advertisements in the digital programming assets.

BRIEF DESCRIPTION OF THE DRAWINGS

FIGS. 2-4 illustrate examples of various sections of an embodiment of a media service ad campaign manager user interface.

FIG. 7 illustrates an example of a section of a scheduling user interface.

DETAILED DESCRIPTION

Figure 1A:
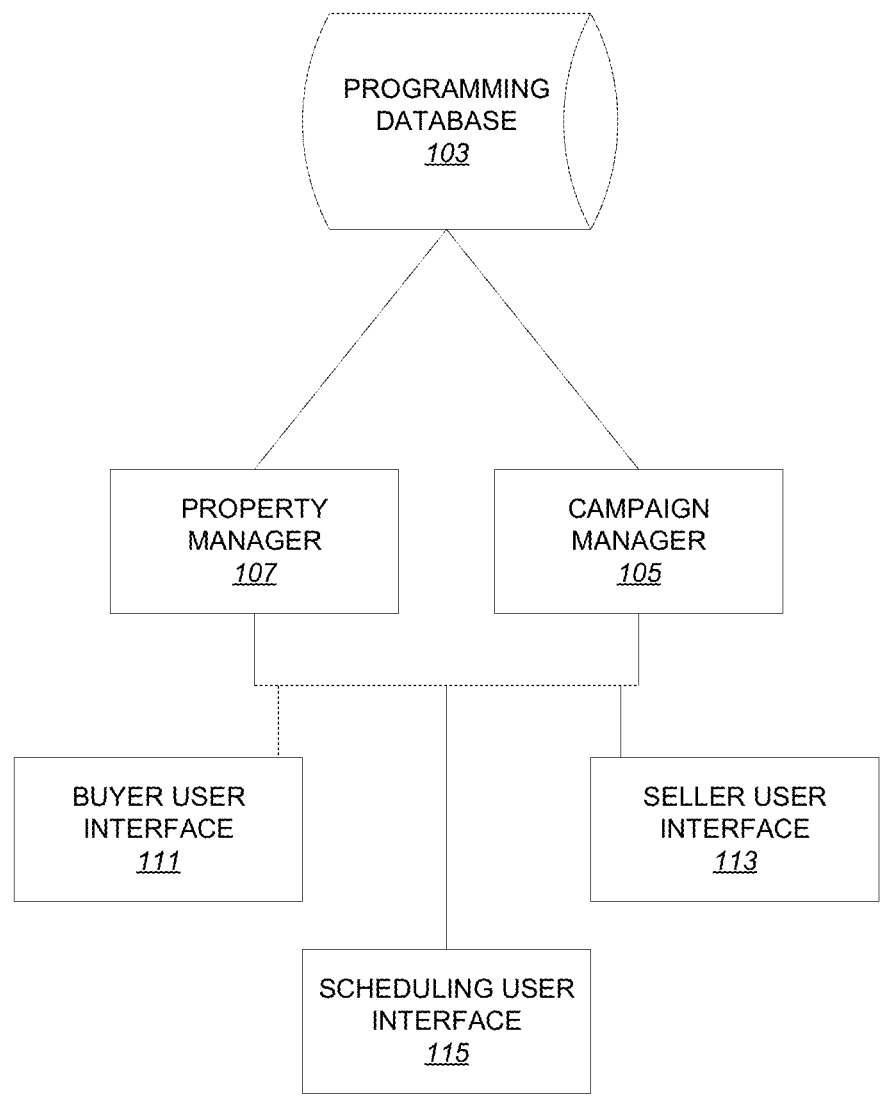
FIG. 1A is a block diagram of certain elements of a system that may be used to manage the promotion of digital advertisements to be placed in a digital media service.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this document, the term "digital media service" refers to refers to any service that includes transmission hardware to deliver video or audio programming to an audience in live or pre-recorded format. Examples include television (i.e. videos) delivered via any format, including but not limited to over-the-air broadcast television transmission systems, cable television head end delivery systems, OTT streaming television channels or streaming video services that are available via the Internet, digital video recorders (DVRs), cloud-based DVRs, and other Internet video; radio transmission systems; and systems for delivering audio or video files over a digital communications network such as systems for webcasting, datacasting, Internet video streaming, Internet radio, podcasting and the like. This document may use the terms "video media delivery service" or "digital video delivery service" to refer to a system that delivers video programming, such as the options described above (e.g., broadcast TV, cable TV and/or OTT services).

As used in this document, a "digital media asset" or "digital programming asset" is a unit of media that will be presented to consumers of a media service (i.e., viewers and/or listeners) in response to a user selection of the asset or a channel on which the asset is presented. In the context of video or audio programming, a media asset may be a program, a group of programs, or a unit of time in which programs will be presented such as a slot or pod or impression. Such digital media assets may be of a fixed length of time (such as a television program) or designated to be dynamic such that the spot length was changed, or was unknown at least at the time when it was first sold (such as dynamic pods that are adjusted as a live program is presented, as may be the case in a sporting or other live event). In the context of non-video visual media, a media asset may be a particular page or part of a page of a website or other digital media asset, and in some embodiments may be allocated to advertisements as an impression (e.g., an instance when a viewer navigates to a particular news page on the web), with or without a temporal condition.

As used in this document, the term "media presentation device" means a hardware item or system containing a processing device and one or more additional hardware components for presenting the audio and/or visual content of a digital programming file to a consumer. The hardware components may include, for example, a display device, an audio speaker, a headphone port, and/or a transmitter containing near field communication hardware (such as Bluetooth hardware) configured to transmit the audio and/or visual content to a proximate display device and/or audio speaker. A "video presentation device" is a device having a display and hardware configured to present the content of streaming video, broadcast or cable video, or digital video files to users, such as televisions, computing devices (e.g., desktop computers, laptop computers, tablets, smartphones), video gaming systems, and wearable devices having electronic displays such as smartwatches and smart eyewear. As used in this document, a "temporal parameter" refers to a measurement or value of a time associated with a media asset distributed by a media service. Examples of temporal parameters include a scheduled start time, a scheduled end time, a day part, a program run time, a time within a program or advertising pod, such as a scheduled commercial break time, a position within a commercial break time, a frame count within a program, a position before or after an event in a program, and the like.

As used in this document, an "advertising campaign" comprises a set of units of inventory of a media service for which the media service will include advertisement messages that share a common idea or theme, or which come from a common buyer. A campaign can be as specific as a collection of specific units, or it can be a collection of criteria for the association of advertisements with units. The campaign could then be fulfilled with any one of many possible sets of inventory units. The media service will present the ads to consumers of various media assets. An advertising campaign may be prepared and presented to include a single media service (such as a television network) or multiple media services (such as television, cable, streaming media, and/or web pages).

FIG. 1A illustrates a system that may be used to manage sales of advertisements in a media service. The system may include a set of programming data 103, which can be one or more databases or other data storage structures containing temporal attributes and other attributes for various media assets that are scheduled to broadcast, stream or otherwise be presented. In addition to temporal attributes, attributes that are stored for one or more of the media assets may include non-temporal attributes such as program attributes (such as title, genre, various ratings, parental guidelines, meta-tags), media type (e.g., broadcast television, cable television, cable, webcast, etc.), network attributes (e.g., network name, typical programming genre or other type, size, or quality), or viewer (or target viewer) demographic (e.g., male or female, age range), audience characteristics (such as income level, hobbies, education level, education area, profession, personality type, body type), consumer behavioral attributes on the media (such as clicking behavior attributes, clickstream, behavior on the TV remote, purchasing attributes on that media, eye-tracking attributes, viewing habits), behavioral attributes outside the presented media (e.g., the above-mentioned attributes from other media or other sources, purchasing habits, detailed purchasing history), geographical attributes (of the consumer in general, of the consumer at the moment, of the consumer's residence(s), of the consumer's movements, of the viewer's proximity to points of interest, etc.), attributes of the device(s) that the user is using (and how) currently or typically, social attributes (such as which TV shows the person has liked or disliked or commented on positively or commented on negatively on a social network such as Facebook or Twitter), or other measurements of viewership and the like.

In some embodiments, attributes for media assets may include content-based attributes that describe or reflect the content of the media asset. Examples include show title, genre, actors/actresses who appear in the asset, language spoken, or even particular actions that appear in the asset (such as an actor drinking a beverage or driving a car).

Thus, the system may permit targeting based on a combination of any number of attributes, for example, combining show, demographic, and even behavioral attributes. These attributes can be at any level of aggregation ranging from individuals to broad collections of viewers, depending on how fine an audience segmentation the targeting technology and data sources support.

In various embodiments, some of the attributes can be measured. Others may be only statistically measured (e.g., 17% of the viewers of this show are males that earn more than $100,000). Other attributes can be inferred. Yet other attributes can be self-declared via subscriptions, questionnaires, and the like. The programming data may relate to a single media service provider or multiple service providers, each of which are presenting media assets in which ads may be purchased.

The system may include an advertising campaign manager 105 which is a set of one or more software modules configured to receive ad buyer purchasing criteria for the purchase of advertisements. The advertising campaign manager 105 may use the purchasing criteria to help the buyer or a sales representative create an ad campaign based on those criteria and available advertising inventory. The advertising campaign manager 105 also may be used to schedule advertisements for an advertising campaign during or after the sale. Thus, the advertising campaign manager 105 may create the campaign as a campaign file or a schedule file that allocates advertising spots to various times, programs and/or regions. The file may be a single file or a collection of files that contains instructions (i.e., rules) and/or parameters (i.e., values to be used with a set of rules) for spot allocation. In some embodiments, the file may be provided to an application programming interface (API) to call for the actual allocation. In other embodiments, if the file is a scheduling file then the file may be provided to a third party digital advertisement insertion system for use in placing digital ads in programming files. Examples of such systems are those that are commercially available from Arris, SeaChange, Google, Adobe and others. Alternatively, the file or API call may be fed into a Business Intelligence (BI) system (e.g., Decentrix) or a traffic system (e.g., Eclipse, Novar, LandMarkOSI, OnAir, Black Arrow, or FreeWheel) which will put it into execution. Alternatively or in addition, the advertising campaign manager 105 may allocate particular ad content (i.e., specific digital media files obtained a media server) to digital programs. The advertising campaign manager 105 also may be used to adjust the scheduling of advertisements for an advertising campaign after the advertising campaign has been sold to a buyer.

The system also may include a media asset property manager 107 which is a set of one or more software modules configured to allow a media service provider or sales representative to add temporal and non-temporal attributes for new media assets (i.e., programs) to the set of programming data, and optionally to update the attributes associated with existing programs and/or the values of those attributes and/or the probability distribution over values or combinations of values of those attributes. The media asset property manager may include a user interface with menus, fields and other tools that enable a media service provider, its sellers or an authorized representative to enter such data.

Ad buyers and media service providers/sellers may interface with the advertising campaign manager by one or more user interfaces. A buyer user interface 111 may include input fields, user-selectable menus or other devices by which a buyer, a buyer's representative, or a sales representative who has access to a buyer's purchasing criteria may enter or select various purchasing criteria for the buyer. A seller user interface 113 may include input fields, user-selectable menus, or other devices by which a media service provider or its representative may add or modify temporal or non-temporal attributes (and their values and probability distributions over values or combinations of values) for new and/or existing media assets. The system also may include a scheduling user interface 115 having input fields, user-selectable menus, or other devices by which a media service provider or its representative may add or modify temporal or non-temporal attributes (and their values and probability distributions over values or combinations of values) for new and/or existing media assets, as well as enter information that will cause the system to assign or adjust the positioning of advertisements to particular positions within programs, pods, or other temporal units associated with media assets. The seller user interface 113 and the scheduling user interface 115 may be the same item, parts of the same item (such as different screens or pages of an interface), or separate items.

Figure 1B:
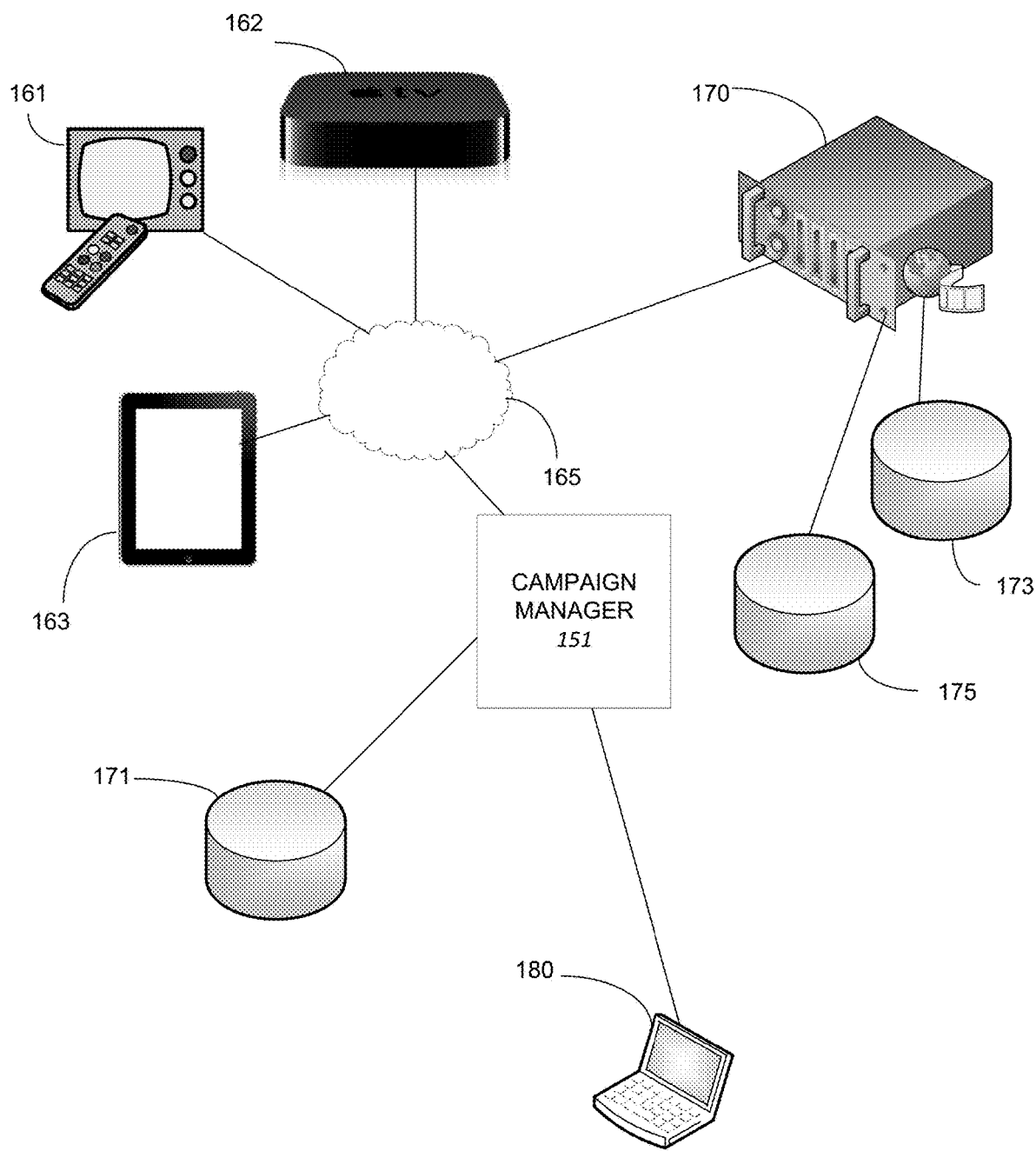
FIG. 1B illustrates additional components of system that also may be used to manage the delivery of a campaign in a media delivery service.

FIG. 1B illustrates additional components of system that also may be used to manage the delivery of a campaign in a media delivery service. The system may include a campaign manager 151, which is a set of one or more processing devices and one or more software programming modules that the processing device(s) execute to perform the functions of this description. Multiple media presentation devices such as smart televisions 161, set top boxes 162 and/or computing devices 163 are in direct or indirect communication with the campaign manager 151 via one or more communication networks 165. The media presentation devices receive and present programming from media assets to users via a display device, an audio speaker, or both. The media presentation devices also include hardware that tracks viewers' viewing activity at periodic time intervals, such as intervals of one minute or less, to identify consumption statistics such as the times at which a consumer is consuming a program and associated media assets, as well as the, program and/or channels that the consumer consumes (e.g., views). The system can later use this data to determine consumption statistics for each media asset, such as a total number of impressions, a rate of impression over time, a number of impressions during a particular program or time period, and the like.

Any number of media delivery services may contain one or more media servers 170 that transmit audio and/or video programming files to the media presentation devices via the network 165. The programming files, which may be stored in one or more programming storage facilities 173, may include standard programming along with media assets that are part of a campaign, such as advertisements or sponsored program segments. The media servers 170 may transmit the programming files in a streaming format, so that the media presentation devices present the content of the programming files as the programming files are streamed by the media server 170. The campaign manager also may have access to a data store of available media assets 175 that are used in various campaigns. The media presentation devices also may include hardware that tracks viewers' viewing activity at periodic time intervals, such as intervals of one minute or less, to identify consumption statistics such as those described above.

Optionally, the system may also include a traffic server (not shown in FIG. 1B) that serves as an intermediary between the media server 170 and other components of the system. The traffic server, when available, will receive scheduling data and generate the commands that cause the media server to present the content of programming files to consumers at scheduled times. An optional business intelligence server (not shown in FIG. 1B) may sit between the traffic server and media presentation devices, or at another appropriate part of the system, to measure consumption data of programming files and media assets.

The campaign manager 151 will store the data captured about what programs and media assets viewers consumed in a data storage facility 171. The system may then use this data in various analytical tasks that will be described below. The campaign manager 151 may compute and store up-to-date aggregate statistics on this data as well. For example, how many households or devices in each population segment (such as NFL enthusiasts, viewers in the market for a car, or households with kids in a certain age range) watched a particular show or network in a given time period.

FIG. 2 illustrates an example of a section of a media advertising campaign manager buyer user interface 200 by which a user may enter various buyer purchasing criteria. Purchasing criteria that relate to scheduling of or target audience delivery for an advertisement or group of advertisements also may be considered to be scheduling criteria, and this document will use the terms "purchasing criteria" and "scheduling criteria" interchangeably except where the context dictates that a criterion relates to only purchasing or only scheduling. Where referring particularly to scheduling or allocation of inventory to a campaign, this document may use the term "placement criteria." The seller may use this interface 200 to specify desired or required temporal parameters, attributes, or placement requirements or restrictions for advertisements that will be included in an advertising campaign. Optionally, the interface may permit a user to define each constraint and each preference at a variety of levels of scope, such as by pod, show, entire semester of a show, entire semester, by a temporal range (e.g., between a particular start time and end time, or by a unit of time on a calendar such as a week or month).

Input fields for temporal parameters may include those such as a campaign start time field 202, an end time field 203 (each of which may be expressed in terms of clock time such as hour and minute, by date, by both clock time and date, or by some other unit of time measure), smoothness criteria 204 and other scheduling requirements or other indicators of time. Other input fields and temporal criteria received may include those such as frequency constraints, in which the user specifies an upper limit, lower limit or range of frequency that an advertisement or group of advertisements may appear within a particular media asset, group of media assets, particular demographic, or the overall campaign.

A frequency constraint can also be at a finer level if the particular measurement technology used supports that. For example, a constraint may state that the campaign has to reach a particular individual (or a set of individuals in aggregate) at least k times but no more than k' times. This may even be measured across multiple shows or other media assets.

Input fields and temporal criteria received may include separation constraints, in which the user specifies a minimum or maximum temporal distance that the media service provider must maintain between appearances of ads within a sequential block of one or more media assets. Such a distance could be as small as a unit of one (meaning that, in the case of a minimum distance that two ads may not air-back-to-back) up to any distance amount. The separation constraints can be used to specify separation between the buyer's own advertisements and/or separation between the buyer's advertisements from competitors' advertisements.

Temporal criteria could also be specified to vary throughout a campaign, such as a requirement to place more ads early in a campaign than later in the campaign or vice versa. Another example is ramping the flow of advertising units within a campaign up as the advertised item's product launch is approaching. Any constraints on the profile of flow of advertisement units over time within the campaign can be used here.

Smoothness criterion input fields 204 may include fields that receive criteria for time units and a maximum amount of change in the distributions of advertisements for the campaign over all time units within the time period. For example, a week-long campaign that includes a smoothness criterion of 10% per day will ensure that ads for the buyer are smoothly distributed over the week and not bundled into any particular day so that no day contains more than 10% more ads than any other day. As another example, a campaign for a 13-week season of a television program that includes a smoothness criterion of 15% per episode are smoothly distributed over the entire season and not bundled into any particular episode. Optionally, the interface may permit the user to specify a media asset type (e.g., scheduled television, on-demand television, or Internet streaming) to which the smoothness criterion will apply.

Input fields for non-temporal parameters may include those such as exclusivity criteria 205, a budget 207, and others. Exclusivity criteria input fields 205 may solicit entries such as those that include a competitive restriction for the placement of advertisements by at least one other buyer in one or more of the media assets that will contain the buyer's advertisement, along with a scope for the exclusivity. The scope can be, for example, a show or a set of shows, or a specific time window, or a combination of the two. The scope can also be a pod, set of pods, or part of a pod. For example, a competitive restriction may include a criterion to avoid placing an advertisement for a first buyer in any program or specified time block that also contains ads for other buyers who are specifically identified, or who are in a particular product category. This system's detailed approach to slot scheduling within each pod also may enable richer pod-level preferences and constraints related to competition, such as, "I am willing to be in the same pod with my competitor, but not back to back with the competitor." A competitive restriction may also include a requirement, such as a requirement that two specific ads or ads for two buyers be placed within the same program or within a particular time period from each other. Competitive constraints and preferences also may include requirements to refrain from placing competitive advertisements within specific media assets regardless of whether the buyer also has an ad placed within that media asset.

Budget constraints 207 may be established at varying levels of granularity. For example, the system may be configured to receive an overall maximum budget for the campaign, an overall minimum budget for the campaign, a budget for a specified portion of the campaign, a bonus amount that the buyer is willing to pay if the campaign satisfies certain criteria, a varying budget with rules indicating how the budget will increase (linearly, piecewise linearly, or nonlinearly) as the audience delivered in the campaign increases, a budget restriction (such as an indication of an amount that the buyer will pay only if a certain audience demographic is delivered in a portion of the campaign), or budgets that are conditioned on certain temporal ad placement criteria being satisfied (such as an ad being placed in a particular program on a particular date). Optionally, the system may even give the user an ability to impose a counting constraint in which the user specifies a first number of media assets or temporal positions that are of interest, but a limitation that the user will only pay for a second (and smaller) number of ad placements. This effectively leaves it to the media service provider and/or the system to place the second number of ads within any of the first number of media assets.

Additional constraints (which can alternatively be expressed as preferences) may include those such as the following: (i) a buyer will accept any k of a set of n shows in the campaign; (ii) minimum and maximum volumes (in units or monetary values) at various temporal and other scopes; (iii) sequence-based constraints, such as sequentially ordered advertisements; (iv) a requirement that advertisements be placed as complementary advertisements (e.g., ad1 on show X, ad2 on show Y; will pay in 1:2 ratio); or (v) counting constraints, (e.g., 8 programs of interest, but will only pay for ads on at most 4 programs). Thus, in various embodiments the system may enable the buyer to identify the different monetary values by expressing preferences over targeting (how much the buyer is willing to pay for various values of the attributes and/or combinations of the attributes) and/or campaign control features (how much the buyer is willing to pay for various campaign control features or combinations thereof).

The system may also allow the buyer to select whether a campaign can be accepted partially or not. In the latter case, the system may require a user to accept a campaign entirely or not at all, and if so this constraint may be included in the optimization model that is used for decision making (discussed in detail later).

The system may also allow the buyer to select whether a campaign has to be guaranteed (to execute according to its specification) or not. A non-guaranteed campaign provides the seller more flexibility in the optimization, and the seller may thus be willing to sell a non-guaranteed campaign at a lower price than the same campaign with a guarantee. In one embodiment, the buyer and/or seller further specifies how meeting the guarantee is measured. One typical default setting would be that all of the campaign's constraints, including quantity delivered (or reach defined in some other way) and budget, are satisfied. As shown, some fields (such as campaign title field 201) may be free-form input fields that accept characters entered by a user. Other fields may include drop-down menus or other mechanisms by which users may select an option from various available options. Examples include the smoothness fields 204 and fields for exclusivity criteria 205. Optionally, the system may select and include some of the options available in any drop-down on a dynamic basis, based on user selections in a previous field and/or stored buyer profile information. For example, an exclusivity field for a buyer whose profile categorizes the buyer as a fast food restaurant may present a list of exclusivity options that include other entities in the same category (fast food restaurants in general), or specific restaurants or restaurant groups that would be competitors to the buyer. Also, the user interface may allow the advertiser to select which industry or industries the advertiser belongs to for purposes of declaring exclusivity to entire industries, or for purposes of helping to narrow down the list of particular competitors to choose for this in the user interface. As another example, if the buyer's profile indicates that the buyer has previously purchased advertisements targeting viewers in a particular geographic zone, it may present that zone as a default value in a field through which the user may enter a geographic criterion.

Optionally, some input fields may include indicators as to whether a selected criterion is a constraint (i.e., a requirement) or a preference (meaning that the buyer would like the criterion to be met, but it is not a make-or-break requirement). For example, an exclusivity criterion selector may include a preference selection interface 206 by which the system may receive a user's categorization of the criterion as either a constraint (i.e., a requirement) or a preference.

In some embodiments, the system may permit an advertiser/buyer to express different monetary values for different campaigns. More generally, the advertiser may even be able to express monetary values for what campaigns other advertisers get and do not get. An advertiser may express monetary values for different ways that the media units are allocated among the advertisers (and some of them may be kept by the seller, for example to reduce advertising fatigue by viewers or to do marketing of the media provider itself).

In one embodiment, the advertisers express such monetary values in the form of preferences and constraints. The preferences and constraints can be on attributes associated with, for example, targeting and/or campaign control. An example of a targeting criterion is an audience targeting criterion such as "I will only pay for female viewers, and I will pay $2 CPM" (where CPM means cost per thousand views), and it can be combined with preferences such as "I will pay $5 CPM for female viewers in California, I will pay $7 CPM for female viewers who earn more than $60,000 annually, and I will pay $16 CPM for female viewers in California who earn more than $60,000 annually." Examples of campaign control criteria include expressions of reach, frequency, smoothness, exclusivity, and placement within an advertising pod (such as first in pod, second in pod, . . . last in pod), bookends (first and last in pod), sandwich (this advertiser's advertisement followed by someone else's, followed by another one from this advertiser), piggybacks (two advertisement slots for the same advertisers back to back), and roadblocks (same slot in multiple shows at the same time, etc.). For example, a constraint can state that the reach has to be at least x, and it can be combined with a preference such as "I will pay $50,000 more if the campaign's flow varies by at most 10% across days within the flight of the campaign, or I will pay $70,000 more if the campaign's flow varies by at most 5% across days within the flight of the campaign."

In general, within such preference expressions the space of different trigger conditions may be combinatorial in the number of attributes as the above targeting example shows, and can thus be cumbersome with large numbers of attributes. Therefore, the system may permit various restrictions on which combinations can be included in the trigger conditions to be added or used in order to simplify the expression of preferences.

In connection with targeting, the system may output, via a seller-side or buyer-side user interface to a user, how much it would cost to achieve a particular targeting (i.e., a particular audience group, show type, or time) by targeting that audience, show type or time. The system also may use a "broad targeting" that is not focused on as specific an audience, program or time but instead on various audience, program or time characteristics (e.g., buying based on broader audience targeting, traditional age and gender metrics, or by traditional show targeting), or a "narrower targeting" that uses more specific characteristics. By way of example, a first type of targeting for an audience may be "males who live in New York City and own a Jaguar car," while a first type of targeting for a show may be "shows on ESPN." A broader targeting for each of these may be "males who live in New York City" and "shows on a sports network," respectively. A narrower targeting for each of these may be "males who live in New York City, own a Jaguar car and eat bananas," and "ESPN's 30 for 30," respectively. This may help buyers understand how much cheaper it is to get what they want using various types of targeting. This can help give a customer an answer that the customer really wants. When giving a quote or campaign offer based on a highly targeted campaign request, they system may show what an equivalent campaign would have cost if bought in a more traditional way with little targeting. "Equivalent" in this context means having the same amount within the target, or the same amount in some other way.

The system may do this at multiple different levels of targeting, not just the finest targeting and traditional coarse targeting, but also how much similar items would cost untargeted, less targeted, and/or highly targeted.

The process of achieving a desired targeting may be done in practice using various methods. For example, in light of all the campaigns and all other campaign requests, the system may process a quote request for the campaign with the targeting equaling the desired targeting. (For purposes of this discussion, we will refer to this as the "first type of targeting.") The optimizer (e.g., mixed integer program, as will be described below) will compute a quote. For the purpose of this example, we designate this quote as a first cost.

Then, again in light of all the campaigns and all other campaign requests, the system may process a quote request for the campaign with a narrower targeting (i.e., a campaign in which the ads are targeted to a more specific audience or more specific shows, networks, times, etc., than the first type of targeting). The optimizer (e.g., integer program) will again compute a quote, this time for the narrower targeting. For the purpose of this example, we designate the second quote as the second cost in case we are interested in the cost via a narrower targeting.

Alternatively or in addition, the system may also process a quote request for the campaign with a broader targeting than the first type of targeting. To determine the cost of reaching a particular targeting via a broader targeting (i.e., more focused on audience or program characteristics and on a specific audience), the system may do, for example, the following. The system may process a quote request using the broader targeting to get a quote. For example, the system may process a quote and compute the cost as $10 CPM for that broader target. Then the system may look at the views that fall within the broader target and determine what fraction or percentage of them fall within the desired target. For example, if 5% of the broader target falls within the desired target, then the CPM cost for the desired target would be $10*(1/0.05)=$200 CPM. In other words, the second cost for the narrower targeting would be $200 CPM.

There are also other ways that the system may determine the cost of reaching a particular targeting via a broader targeting. For example, the system may process quote requests for a broader campaign with increasing impression goals until it generates a campaign in which the number of impressions that match the desired (i.e., not broad) target equals or exceeds the specified number of impressions in the desired target.

In one embodiment, the user specifies base pricing and a list of bonuses, each with its own trigger condition (or conditions). The triggered bonuses are then summed up and added to the base pricing to come up with the user's expression of value for the campaign. For example, the base pricing parameters received from a buyer may be "I will only pay for female viewers, and I will pay $2 CPM" and the list of bonuses may include "I will pay $2 CPM more for viewers in California" and "I will pay $5 CPM more for viewers who earn over $60,000 annually." Both the base values and bonuses can be absolute numbers or variables that can depend (linearly such as CPM, piecewise linearly, or nonlinearly) in the volume of units awarded or delivered to the campaign. Furthermore, there can be restrictions on how the bonuses can be combined or how much they can amount to overall. In one embodiment these could come from the buy side but they could also come from the sell side.

As an example, if the system receives a user's categorization of two or more of the purchasing criteria as preferences, along with a bonus amount that the first buyer will pay if the preference is satisfied in the advertising campaign and a constraint on how the bonus amounts may be aggregated, then when developing the advertising campaign the system may do so such that the advertisements are distributed among the time units for media assets in order to satisfy the criteria that are categorized as preferences. It may also determine a cost for the campaign that includes the bonus amounts as limited by the constraint.

Optionally, the preference selection interface 206 also may include an input by which the system may receive a user's identification of a bonus value (i.e., an amount above a base level, or an alternate base monetary value) that the buyer will pay if the campaign satisfies the preference. A bonus value may be expressed in terms of a numeric value, a percentage, an equation, or a rule that indicates how the bonus will increase as various preferences are cumulatively satisfied in the delivered ad campaign.

Figure 3:
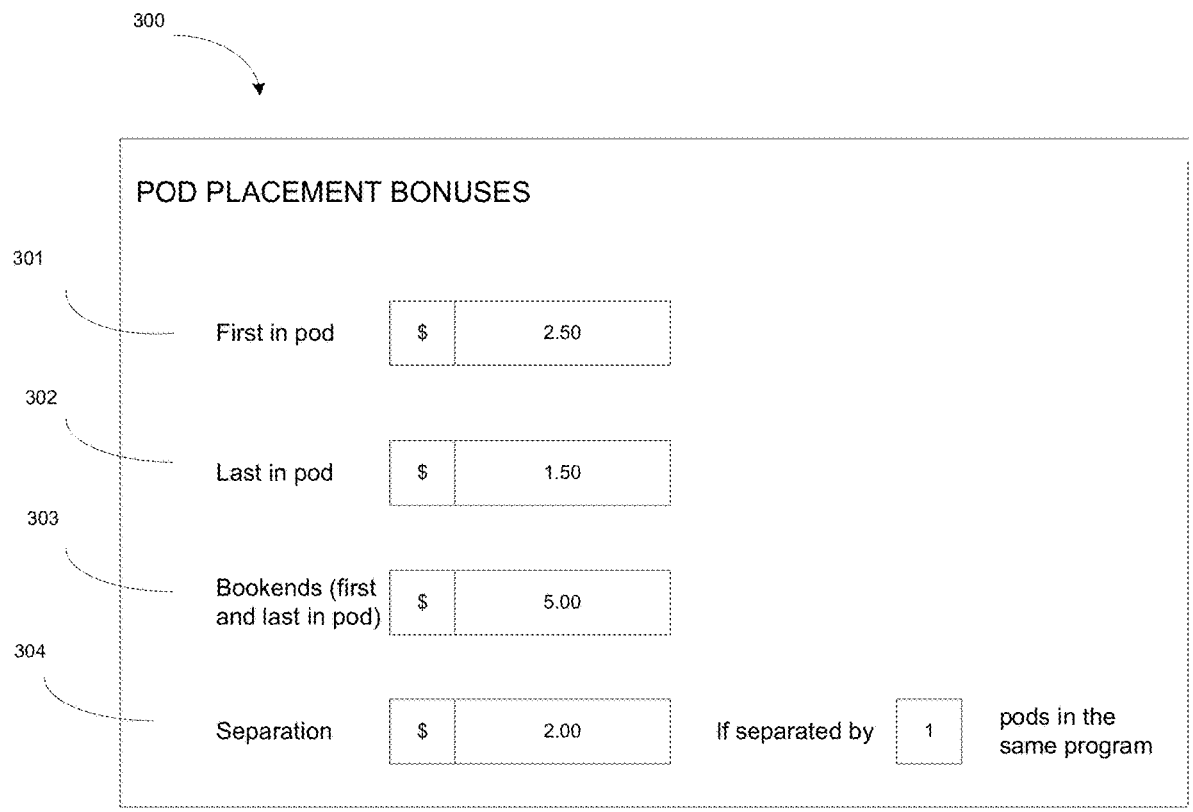

In addition, the system may include an interface by which a user may specify varying bonus values for different criteria. An example of this is shown in FIG. 3, which shows an interface portion 300 wherein the system may receive a set of various user-selected bonus values 301-304 if the advertisement is placed at various positions in a pod or a group of pods. Fields such as these may allow the user to express a preference for one or more slots in an advertising campaign.

Figure 4:
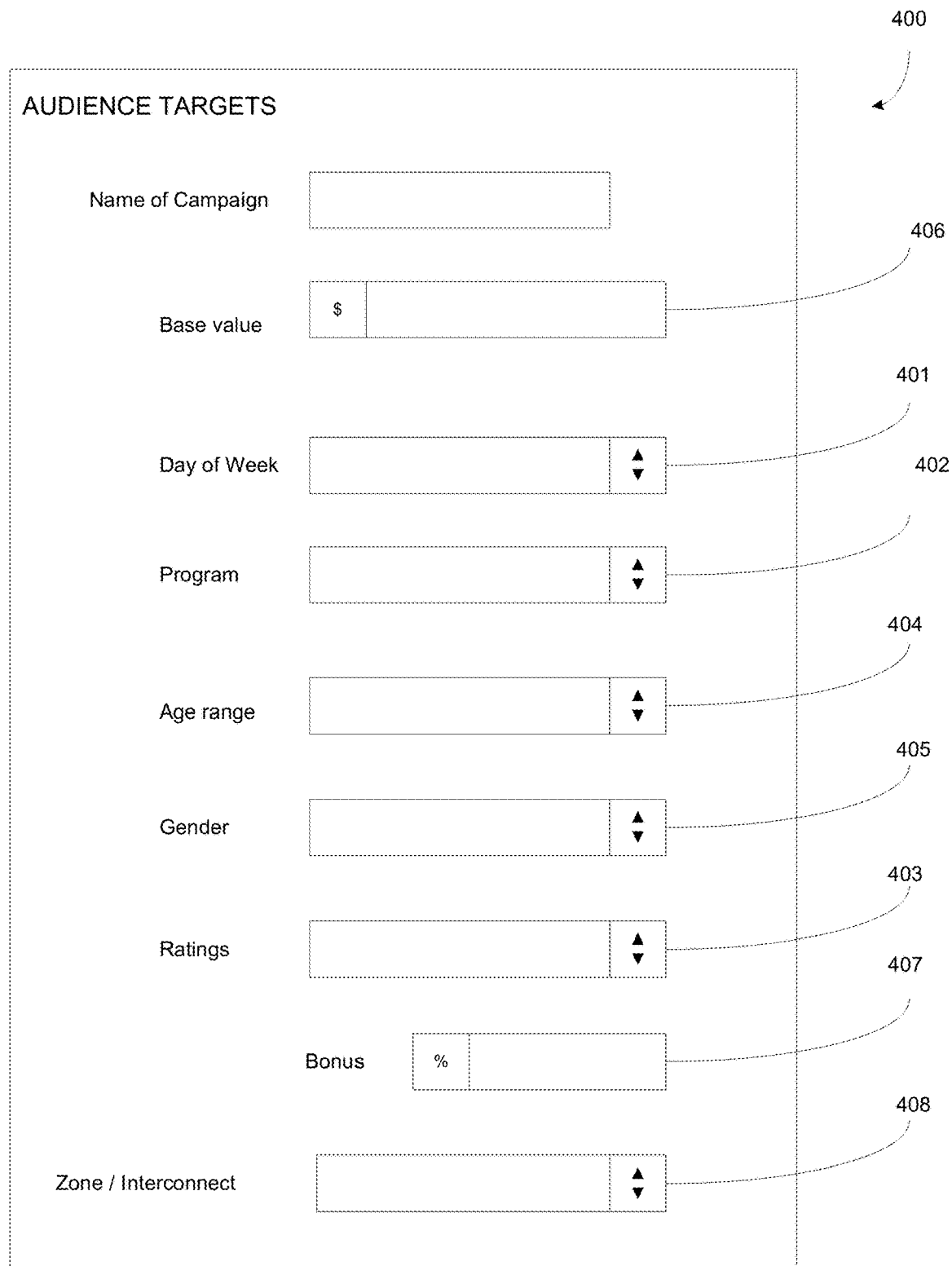

FIG. 4 illustrates another buyer user interface portion 400 in which the system may receive user-specified target audience criteria. The fields for receiving the criteria may include fields for criteria such as temporal criteria 401-402 and non-temporal criteria 403-405 and 408. Temporal criteria may include criteria relating to the position at which one or more ads will be placed, such as a position within a pod, a particular media asset 402, and/or a particular day 401. Non-temporal criteria may represent desired attributes of programs in which advertisements will be placed, such as historic or actual ratings for the program 403, genre, parental guidelines, a channel or network that is presenting the program, and other attributes. Non-temporal criteria also may represent desired attributes of the audience who views the program, such as age range 404, gender 405, income, and the like. Additional target audience criteria may include criteria that one or more of the viewers for the media asset, advertisement or campaign have purchased a specified good or service within a specified time period, criteria that one or more of the viewers have exhibited a particular viewing pattern over a time period. Additional target audience criteria may include a requirement that one or more of the viewers have expressed positive feedback on a social networking service for a media asset in the campaign, such as by liking, sharing, or otherwise expressing positive feedback about a program on a social media service, or a requirement that a viewer has not publicly expressed negative feedback on a social network for a media asset in the advertising campaign. Other target audience criteria are possible.

In some embodiments, the number or types of audience attributes and other criteria that a user may specify may be unlimited or virtually unlimited. For example, the system may provide a large set of attribute categories to the user, and in some embodiments it may permit a user to define new attributes for use in new campaigns. Optionally, the system may permit the system to define any such criteria on a per-program basis or on a cumulative, multi-program (i.e., cross-show) basis.

Optionally, the fields for receiving target audience criteria may include fields for financial criteria such as a base value 406 for the purchase of some or all of the campaign, and a bonus value 407 representing an additional amount above the base that the buyer will pay if all or a specified portion of the criteria (e.g., ratings) are satisfied. A bonus value may be expressed in terms of a numeric value, a percentage, an equation, or a rule that indicates how the bonus will increase as various preferences are cumulatively satisfied in the delivered ad campaign.

Optionally, the constraints (and preferences) can also include criteria 408 such as a specified zone or interconnect (i.e., a group of zones) within which the buyer desires the advertisements to be presented to viewers. For example, the optimizer can employ a constraint that if a slot is allocated to an interconnect-level campaign, then the advertisement has to run in that same slot (i.e., same time) in all zones belonging to that interconnect. This constraint can be relaxed in several ways, such as requiring only a certain number of zones within the interconnect to run that advertisement in that slot.

Figure 5:
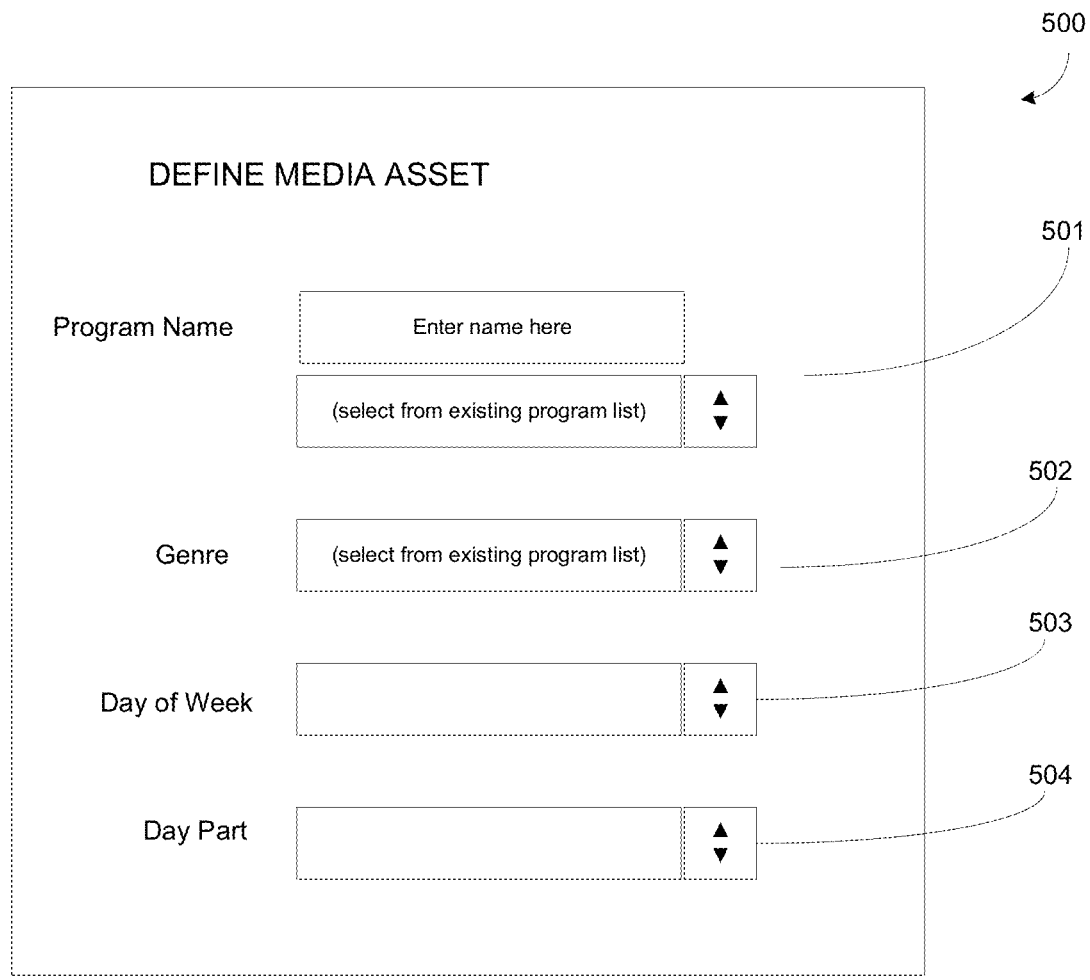
FIGS. 5-6 illustrate examples of various sections of an embodiment of a media asset property manager user interface.

FIG. 5 illustrates an example of a section of a media asset manager user interface 500 by which the seller may enter various attributes for a media asset such as a television show. The seller may use this interface 500 to define and add temporal attributes 503-404 and other, non-temporal attributes 501-502 for new programs and other media assets to the database so that the media assets and associated data can be used in future advertising campaigns. This interface also may permit a seller-user to modify attributes of existing programs in the database.

Figure 6:
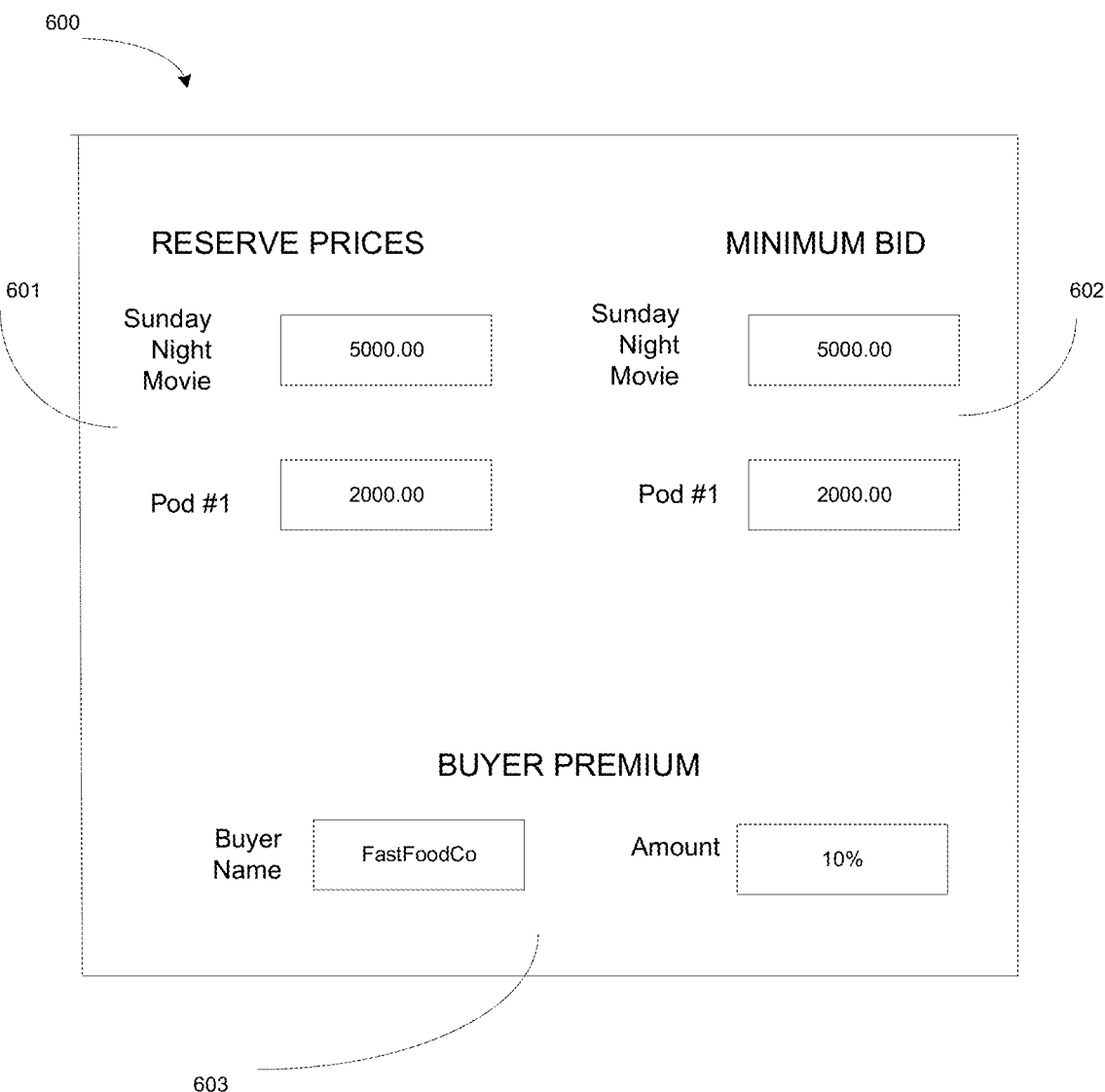

The media asset manager user interface also may include one or more sections that permit a media service provider or its representative to identify seller-side criteria for assets or campaigns. For example, as shown in FIG. 6, such as interface 600 may include fields wherein the system may receive user-specified reserve prices 601, minimum bids 602 or other financial criteria for the placement of advertisements within various media assets. The interface also may include fields that allow the seller to add a premium value 603 to bids or budgets received from a particular buyer (for example, to favor the bidder in the allocation optimization), a requirement to provide a particular buyer with audiences having specified attributes (plus a quantity to provide, such as a minimum quantity), a rule to factor in a make-good cost when developing the advertising campaign for a particular buyer, and other criteria.

Furthermore, reserve prices do not have to be only on individual items: there can be reserve prices on bundles (campaigns). The seller can use reserve prices to represent the value of the inventory in the future. In one embodiment, in the optimization the system maximizes revenue, viewing the reserve prices as campaigns that the optimizer can accept. If a reserve campaign (on an item or bundle) wins, that means that the seller keeps the corresponding inventory unsold currently, in anticipation of better sales opportunities in the future.

The system also may support bundling of sales units, meaning that they have to be sold together or not at all. This may help revenue, especially if competition is thin.

Optionally, the seller can include seller-side criteria that incorporate its own marketing campaigns into the optimization by specifying them as zero-budget campaigns (with potentially a variety of constraints as in other campaigns) but including a constraint that they must be fully satisfied. This approach can also be used to represent prior commitments made to buyers, for example, commitments made outside the system in manual negotiations. This option enables a manual sales/automated sales hybrid.

Referring to FIG. 7, the system also may include one or more scheduling interfaces 700 by which the system presents to a user various characteristics of accepted and/or requested campaigns. The system may provide this as a scheduling interface by which a user may view reports of each campaign 701, and view and optionally modify various characteristics of a campaign such as the distribution of a particular campaign's advertisements over particular units of time 702 or which campaign is the winning bidder for (i.e., has been assigned) a particular slot of a media asset in the schedule 703. The scheduling interface also may include fields by which a user may enter: (i) campaign control constraints on behalf of the buyers, such as smoothness; (ii) seller-side constraints and preferences as in a sales and allocation setting; and/or other criteria.

Figure 8:
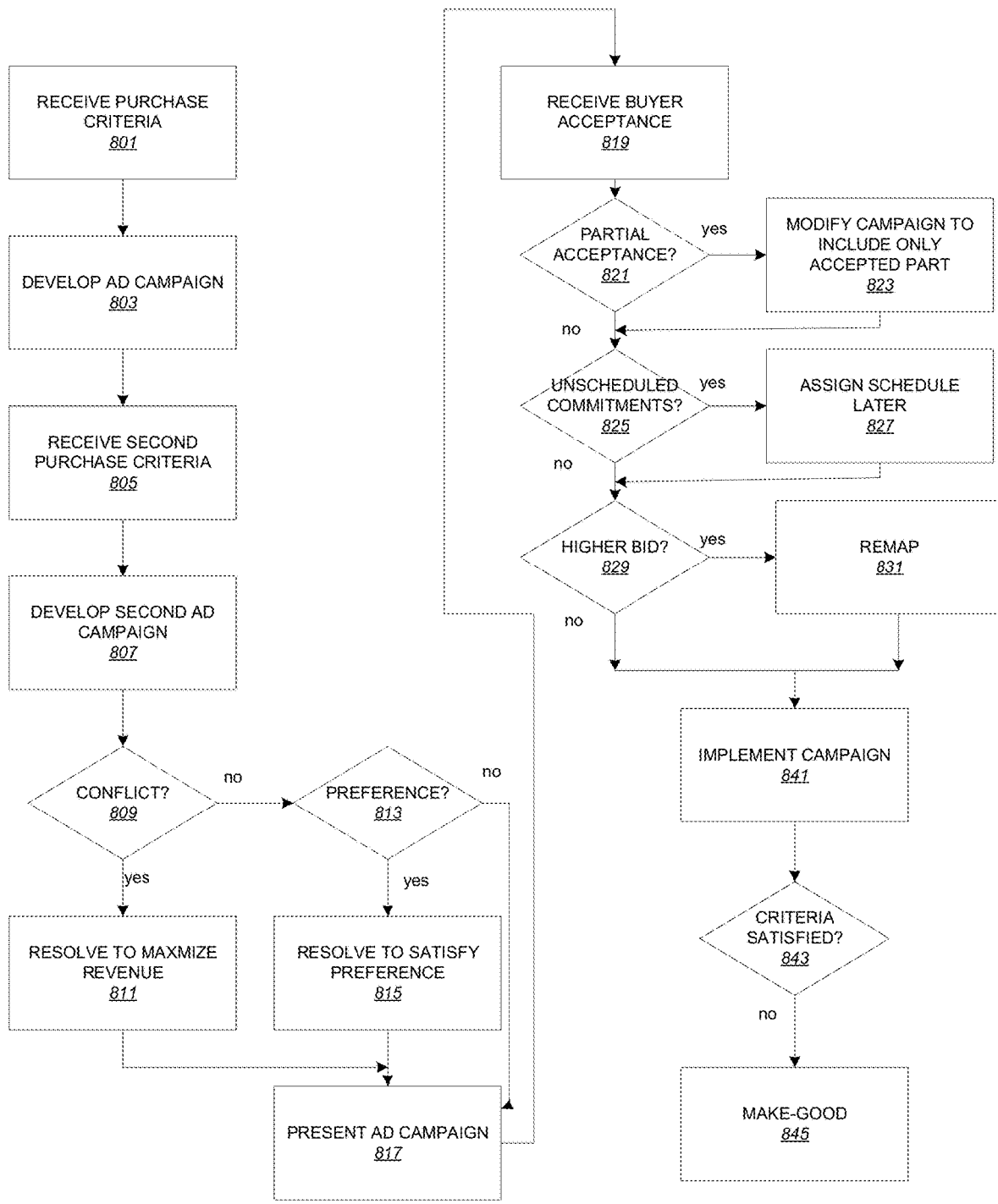
FIG. 8 is a flowchart illustrating an example process of building an ad campaigns.

FIG. 8 is a flowchart illustrating an example process of building advertising campaigns. In this example, an advertising campaign manager will receive a buyer's purchasing criteria for a purchase of advertisements in a media service (step 801). The criteria may include a set of temporal parameters, program attributes, and/or placement requirements or restrictions that the buyer desires its ad placements to satisfy. Example criteria may include any of those discussed above, such as budget criteria, which may include a minimum and/or maximum budget for an individual ad, a group or ads or an entire campaign. The criteria may be received from the buyer or another person via a user interface, or the criteria may come from other sources such as stored data sets, web service calls or data feeds.

In addition to, or instead of, getting constraints and preferences directly from users, in some embodiments the system may leverage a user interface or other tool that suggests what the buyer's preferences should be (based on, for example, historical viewer responses or what media assets the advertiser has bought in the past). For example, that tool could provide answers to questions like "how broadly should a particular business target?" The answers can serve as input (constraints and preferences in campaign requests) in the system.

Optionally, the system may enable a user to designate (or it may otherwise receive a designation of) any purchasing criterion as a constraint, meaning that the system must not schedule an ad unless the scheduling meets the required purchasing constraint. The system also may enable a user to designate any purchasing criterion as a preference, meaning that if multiple possible placements would satisfy other criteria then the system should give preference to those placements that also satisfy the preferred criteria. In some embodiments, the preferences take the form of expressions of monetary value, so they will automatically be taken into account in the optimization through revenue maximization.

The system may then use the purchasing criteria and the temporal parameters in the database to automatically develop an advertising campaign for the buyer (step 803). The advertising campaign will include a set of media assets in which advertisements will be placed for the buyer, along with the scheduling parameters indicating when the advertisements will run within each program. The system may do this using any suitable algorithms, such as those that require the selection of ad placement characteristics (i.e., programs and schedule parameters) that: (i) satisfy each constraint in the purchasing criteria; (ii) satisfy at least a threshold number or percentage of the constraints in the purchasing criteria; (iii) minimize some constraint relaxation cost function; (iv) maximize revenue minus a constraint relaxation cost function; (v) maximizing profit subject to satisfying all or at least a threshold number of or certain constraints; or (vi) have purchase price attributes that, in total, meet the budget criteria in the purchasing criteria. Example algorithms indicating how this may occur are described below in the discussion of a mixed integer program.

The system may then present the ad campaign to a user (step 817) for review, approval, and/or modification. In the context of this discussion and the associated claims, the term "ad campaign" or "advertising campaign" is intended to cover embodiments that include an entire campaign as well as embodiments where the system analyses, selects and presents various elements of a campaign (such as individual advertisements, subsets of all ads in a campaign, or particular programming or time blocks). Here an advertising campaign can be also defined at a level of abstraction so it may be instantiated onto specific media units later in alternate ways. For example, when a buyer places a campaign request for sports, the campaign can be for basketball in California without specifying exactly which slots within which pods are going to be part of the campaign.

As examples, if the system receives a start time, end time, duration, a requested slot or other temporal criteria for the buyer's campaign along with a budget constraint, it may develop the advertising campaign to satisfy those criteria. If the system receives a smoothness criterion and a time unit for the smoothness criterion (where the time unit is a subdivision of the campaign's overall time period), it may develop the campaign so that advertisements are distributed among the time units for the media assets, such as scheduled television programs, in a manner that does not violate the smoothness criterion. If the system receives a separation criterion for a buyer's campaign, it may develop the campaign so that the buyer's advertisements and placements of ads of a user-specified type are positioned in a manner that does not violate the separation criterion. If the system receives a geographic criterion such as a requested zone or interconnect, it may develop the campaign so that advertisements will be presented to consumers who are located in places that satisfy the geographic criterion. Example algorithms indicating how this may occur are described below in the discussion of a mixed integer program.

Allocation optimization is an important, and difficult, part of yield management. It involves deciding what inventory spots to give to what orders so as to maximize revenue, subject to various constraints. The number of possible solutions (i.e., allocations—mappings of spots to orders) is very large—too large for a human to identify in his or her lifetime if the human were even able to identify all such allocations. An allocation is considered to be "feasible" if it satisfies all, or at least a threshold number of, the constraints. An allocation is considered to be "optimal" if it is feasible and yields the highest objective function value (e.g., revenue or profit) among all feasible solutions.

The constraints may include, and are not limited to, the following:

(a) various forms of targeting by network orders and audience orders;

(b) whenever an interconnect network order is given a spot, it must get a spot at the same exact time in all zones of the interconnect;

(c) whenever an audience order is satisfied, it must get at least the number of impressions that it requested for each of the zones of the interconnect;

(d) marketing orders must be satisfied despite contributing zero revenue;

(e) separation: marketing assets relating to the same product category cannot be allocated to the same break, or within a specific time period of each other.

(f) super-zone orders: some orders may require a single network in multiple zones;

(g) super-network orders: some orders want multiple networks in a single zone.

(h) each order must fully satisfied to obtain any revenue from it.

In addition, certain orders may be prioritized over others. For example, orders designated as "must air" may be prioritized over orders designated as "should air," which may be prioritized over orders designated as "can shift."

The run of the system may proceed conceptually in waves, wherein with each wave new data is received and the system determines results. In each wave, the system may reallocate the orders from previous waves in order to make room for the new orders.

The may leave a percentage of orders unfilled. The system may first run the optimizer under the constraint that all orders must be filled. If it turns out that this problem is infeasible, there is no solution that satisfies all marketing orders with the given constraints. If so, i.e., if the system has proven that the problem itself is infeasible, it may remodel the optimization problem to allow marketing orders to go unfilled, but with a high internal penalty for going unfilled in the optimization.

The system may be flexible as to how to prioritize the satisfaction of marketing orders versus revenue, and how to handle the different priority classes of orders. In other words, if a buyer or seller does not like the tradeoffs that the system struck in its allocation system algorithm, the system may enable that entity to specific parameters to be adjusted to strike the tradeoffs in a different, customer-preferred way.

In some embodiments, the system also may receive one or more seller-side constraints, such as premium values to be assigned to particular buyers, reserve price or minimum bid restrictions, a requirement that certain campaigns be accepted regardless of the budget, or a rule to factor in a make-good cost in a revenue analysis when developing the campaign. Seller-side criteria also may include a requirement to provide a buyer with an audience having certain attributes (and/or quantity). Such an embodiment provides a way to include commitments that have been negotiated outside the system into the optimization system rather than having to earmark specific inventory for those commitments, so that the system will decide what inventory is best to use to satisfy those prior commitments in light of all campaigns, campaign request, state of execution of campaigns, supply, demand, supply projections, and demand projections). If the system receives such seller-side criteria, then it may develop the campaign to satisfy the seller-side constraints or other seller-side criteria. Example algorithms indicating how this may occur are again described below in the discussion of a mixed integer program.

Seller-side criteria also may include undersell criteria or oversell criteria. There can be value in leaving some slots vacant, that is, underselling the available inventory, in order to leave inventory for future sales. The system may be capable of finding the optimal undersell by including an opportunity cost for inventory that represents how much each piece of inventory can be expected to sell for in the future. Furthermore, even if an opportunity cost is not given, the system may provide optimization-based insight about underselling by constraining the number of slots sold. The system is also may produce optimal analysis of undersell where the undersell is constrained to certain subsets of the inventory, such as underselling prime time, particular networks, particular audience segments, premium programs, inventory for political advertising, etc. The system also may be used to provide optimization-based insight about oversell, that is, selling more than 100% of the inventory. The resulting optimized detailed allocation identifies where it would be most valuable to create additional inventory. This can also be done without looking at the detailed allocation, by allowing hypothetical oversell in different inventory segments in turn to see where the revenue would increase most by increasing inventory. Again, the inventory part that is to be hypothetically increased in that analysis can be defined by network, day-of-week, daypart, audience segment, or any combination of attributes.

When selecting the set of media assets for inclusion in the advertising campaign, it may be the case that multiple candidate media assets have temporal and/or non-temporal attributes that meet the buyer's budget criteria and other required purchasing constraints. If so, then the system may select, from the candidate set of media assets, a subset of the assets that maximizes a revenue opportunity for the media service provider while remaining within the buyer's budget criteria. By maximizing a revenue opportunity, the system does not necessarily need to always guarantee that the media service provider will yield the highest possible return. However, at a minimum the phrase "maximizing a revenue opportunity" in this document means that when presented with two or more options, the system will select the options that yields the highest revenue among the options, or that yields the highest revenue so long as the campaign also satisfies other buyer or seller criteria, or at least not the lowest revenue among the available options. The system may do this using any suitable process.

For example, if a buyer has identified a target audience criterion and a bonus amount that the buyer will pay if the advertising campaign delivers an audience that satisfies the target audience criterion, it will give preference to developing the campaign so that it will yield the bonus amount. As an example, if a first buyer designates a particular slot as bonus-eligible and no other buyer bids a higher amount for that slot, it may assign an advertisement for the first buyer to the designated slot. Thus, the system may perform at least preliminary slot-level scheduling as part of the revenue optimization process, before the buyer actually needs to commit to purchasing the a campaign.

Similarly, if the first buyer designates an exclusivity preference, such as one that includes an exclusive time period and a competitive restriction, it may determine whether developing the campaign to satisfy the preference would maximize a revenue opportunity for the media service provider and if so, it will develop a campaign for a second buyer in a way that does not violate the first buyer's exclusivity preference.

An example of a suitable optimization process is use of a linear or non-linear mixed integer program (MIP). With the MIP, variables can be specified such as binary variables indicating whether or not a campaign is accepted, or real variables representing to what extent a campaign is accepted and/or rejected. The MIP will receive an objective that is to be maximized (i.e., total revenue or total profit (i.e., total revenue minus total cost, where the total cost can be, for example, the sum of the inventory acquisition costs of the allocated ad spots or the sum of the opportunity costs from later sales of the allocated ad spots)), and constraints and preferences, to solve the issue of winning bid (i.e., campaign requests, also known as proposal requests, also known as RFPs) and ad placement. There may be multiple bids to be decided simultaneously which may want overlapping inventory and more than one of which may be accepted. For example, a constraint may state that two ads from the same advertiser category cannot appear in the same pod (e.g., break in a television program). The MIP then outputs values to the decision variables. These decision variables can include which campaigns are fully accepted, partially accepted and to what extent, versus rejected (represented by one campaign-specific variable that can take on value 1, between 1 and 0, or zero, respectively), and also which exact spots go to which campaigns (e.g., represented by a variable for each (spot, campaign)-pair, the variable taking value 1 if that spot is assigned to that campaign, and 0 if otherwise), and which ad copy (also known as a "creative") runs in which spot (e.g., represented by a variable for each (spot, ad)-pair, the variable taking on value 1 if that ad is allocated to that spot, and 0 otherwise). The constraints of the application are then represented via mathematical inequalities and equalities among these variables in the MIP. For the MIP solving process to be understandable to a layman, the layman may view MIP solvers as trying all combinations of assignments of values to the variables. For each such combination, the solver then tests whether all constraints are satisfied, in which case the solution is feasible. The solver keeps track of the best feasible solution found so far, i.e., the one whose assignment of values to variables has given the best value to the specified objective function. Once the system has gone through all combinations of assignments of values to variables, the best one found so far may be considered the best overall because there are no other ones to challenge it left.

In more detail, to solve a MIP, in order to keep track of the combinations of assignments of values to variables, one can construct a search tree in memory such as random access memory (or on a slower storage medium such as disk). At the root of the tree one branches on a variable, e.g., whether a campaign designated as "campaign 17" is accepted versus rejected (or, in the case of partially acceptable campaigns, for example, whether campaign 17 is accepted more than 40% or less than 40%). That decomposes the remaining problem into two worlds: one where campaign 17 is accepted and one where campaign 17 is rejected. Within each of those worlds the algorithm then recursively branches on a different variable until all the variables' values have been decided. For example, in the world where campaign 17 is accepted one could then branch on whether campaign 5 is accepted or rejected, and in the world where campaign 17 is rejected, one could then branch on whether campaign 3 is accepted or rejected, and so on. This tree enables one to keep systematic track of which combinations of assignments of values to variables have already been tried and which still need to be tried.

A benefit of using a MIP is that a MIP can handle all the constraints of a campaign at once, multiple campaigns that have been accepted, campaigns that have been accepted and ones that are still being decided for admission. The MIP can not only satisfy the constraints to obtain a feasible solution but also do so while maximizing or otherwise achieving a stated objective among all feasible solutions.

The system also may use in the MIP solving forms of propagation, such as a linear programming relaxation of the MIP, to find what values are implied to variables based on the branching decisions from the root to the current node (current "world" as per the description above) in the search tree. The MIP solver may also use other techniques to avoid having to enumerate all assignments of values to variables in order to improve the run time of the algorithms. Further information about MIP solving can be found, for example, in the book *Integer and Combinatorial Optimization*, authored by Nemhauser and Wolsey (1999). Alternative algorithms for solving this MIP problem include branch-and-bound, branch-and-cut, branch-and-price, local search, simulated annealing, genetic algorithms and the like.

In another aspect of campaign development, the system may have access to at least some digital media assets that include dynamic content with variable components that can be selected at the time the campaign is presented to audience members based on one or more dynamic constraints or preferences (such as which ad, in isolation, would be most valuable to show). For example, the dynamic content may include content that can be changed at the time of presentation, or groups of content alternatives that may be selected at the time of presentation. The dynamic content may be associated with metadata, and the system may select one or more of the variable components dynamic content for presentation if it has metadata that corresponds to the dynamic constraint. The system may not include dynamic content (or individual variable components of the dynamic content) if its metadata conflicts with or does not correspond to the dynamic constraint. The dynamic constraint may be determined at the time of presentation based on user input into the system or based on metadata associated with the programming being presented. For example, a dynamic constraint for a children's program may require that the dynamic content have metadata indicating that it is appropriate for children to view. As another example, the system may use dynamic content of a media program (e.g., a sports game or news show) to dynamically decide which digital media asset to plan present with the media program in a way that honors content-based constraints (such as no adult ads in children's' shows) and/or campaign level constraints (e.g., smoothness and non-concentration) and/or allocation-level constraints (e.g., the allocation can have at most or at least k advertisers). In one embodiment, this can be done by checking whether the constraints would still be satisfied if a dynamically-selected spot were shown. In a more complex embodiment, could the system may re-optimize all, or part, of the future allocation so as to make the dynamically-selected digital media asset insertable while satisfying all the constraints, and possibly at the same time optimizing the rest of the campaign (e.g., for profit) in light of the decision of what dynamically-inserted ad was inserted (which may have changed what the optimal—e.g., profit-maximizing—way to fill the rest of the campaign is).

Alternatively or in addition to sheer revenue maximization, alternative objectives can be used in the optimization program. For example, forms of robust optimization, stochastic optimization, or quadratic optimization can be used to determine solutions that are robust to risk, such as demand and/or supply fluctuations. As an example, the system may choose an allocation that will give high value and low makegoods under various uncertain scenarios (ratings variations, lineup changes, etc.). Any suitable optimization techniques for robust, stochastic, and quadratic optimization may be used in this process. Such risk can also be mitigated through additional constraints in the optimization model.

To determine or discover prices or quotes for campaigns or portions of campaigns, the system may perform a computation such as the following: One wants to know what price a given campaign would have to offer to be accepted. The system may try different prices (e.g., using binary search) and run the optimizer (with all the information about all the other campaigns, etc.) for each price to narrow down the price point at which the campaign changes from rejectable to acceptable. Another way to do this determination is to force the campaign to be accepted (via a constraint) while having zero price, and seeing how much the overall allocation revenue drops. The drop is the amount that the campaign would have to pay to become acceptable.

Optionally, the system may automatically resolve, or it may help a user resolve, conflicts between multiple potential buyers and determine how best to create multiple advertising campaigns that avoid overlapping ad commitments. For example, if the system receives a second buyer's purchasing criteria for second buyer's ad campaign (step 805), the system may use the second buyer's purchasing criteria and the temporal parameters in the data set to develop a second advertising campaign for the second buyer (step 807). The second campaign will includes a second set of media assets, a second set of advertisements for the second buyer, and temporal parameters for each advertisement in the second set.

If the system determines (step 809) that the first advertising campaign and the second advertising campaign include a common ad placement for a particular media asset (i.e., commitments to air two ads at the same time), and if one of the ad placements will maximize a revenue opportunity for the seller (step 810), then the system may resolve this conflict (step 811) by determining which ad placement of the first and second advertising campaigns will maximize a revenue opportunity for the media service provider, including the common ad placement in the advertising campaign that will maximize the revenue opportunity for the provider, and modifying the other advertising campaign by replacing the common ad placement in the other advertising campaign with a different ad placement that meets the purchasing criteria for the other advertising campaign's buyer (step 817). Suitable methods of determining which campaign will maximize a revenue opportunity are discussed above.

Alternatively, or if the revenue opportunities are substantially equal for both options, then the system may determine whether resolving the conflict in favor of one campaign or the other will satisfy one of the potential buyers' preferences (step 813). If so, then the system may resolve this conflict (step 815) by determining which of the first and second advertising campaigns will best satisfy a buyer preference, include the common ad placement in the advertising campaign that will best satisfy the buyer preference, and modify the other advertising campaign by replacing the common ad placement in the other advertising campaign with a different ad placement that meets the purchasing criteria for the other advertising campaign (step 817).

After the buyer accepts the campaign, the system may then cause it to be implemented 841 on the media service. It may do this by assigning advertisements to multiple media assets that are presented on multiple media, such as broadcast television, cable television, on-demand television, online streaming media, downloadable media, and the like. For example, the system may distribute ads so that they are assigned to positions in at least a television program and an on-demand program that is distributed via an online video distribution service. Optionally, in some embodiments it may distribute the advertisements among multiple services, so that a single advertising campaign includes ads that are distributed among multiple sellers. The system may do this automatically, or it may transfer rules, templates, files and/or data sets to the media service provider so that the provider may do it.

In some embodiments, the system may receive a buyer acceptance 819 of a campaign with an indicator that the buyer is only willing to accept a part of the campaign 821. If so, the system may automatically modify the campaign to only include the accepted part 823. The modification may include developing and presenting new pricing attributes for the campaign to the user, in which case the user may be given the opportunity to accept or reject the modified campaign, and potentially provide additional constraints and preferences As a special case of this process, the accepted part can be empty, in which case the system can suggest a new campaign.

In some embodiments, the system may develop campaigns to permit flexible scheduling of advertisement/media asset assignments. For example, when developing a campaign, the system may preliminarily assign any or all of the advertisements of a campaign to particular positions (i.e., to particular media assets, or to particular temporal positions associated with one or more media assets) in the campaign. However, the system may not present all of the assignments to the first buyer as commitments to schedule an ad a particular position. Instead, at least some of these preliminary assignments may be treated and presented as unscheduled commitments 825 that will be assigned or confirmed at a later time 827. An unscheduled commitment is one in which the buyer is not guaranteed that a particular ad will be allocated to a particular position or scheduled at a particular time, but instead the seller retains flexibility to allocate, reallocate or reassign the ad in the future. This may happen if, for example, multiple media assets have attributes that will meet the buyer's criteria. If so, then the system can assign advertisements to media assets or temporal positions after it has more information to determine which assignments will maximize a revenue opportunity for the media service provider, such as after it receives other campaign requests from other buyers, or refined supply and/or demand projections. As an example, if a campaign request from another buyer includes a higher bid for the placement of an ad in a particular slot 829, the system may remap 831 the first campaign to move an ad from its temporary position (e.g., the particular slot) and into another position that satisfies the first campaign's buyer criteria so that the higher-bidding buyer can be awarded the particular slot. When doing remapping 831, the system also may re-optimize the first campaign to determine which new position, media asset association, or other configuration of the ad in the campaign will maximize the revenue opportunity for the media service provider.

Remapping can be motivated and triggered by any event, such as a new campaign request arriving or supply or demand projections changing, or even a certain time passing with nothing unplanned happening.

In remapping the system may reoptimize what ad inventory gets allocated to what campaigns. Scheduling decisions can be included among those allocation decisions, but don't have to be. The decision variables can be at abstract levels (e.g., do we allocate basketball or golf programming to a particular campaign) or fully concrete (e.g., what exact slots are allocated to what campaigns).

In this reoptimization, the system could take any or all of the following considerations into account if available: execution state of existing campaigns; campaign commitments made so far (which can be abstract so as to retain flexibility to remap); those preferences that are still valid in accepted campaigns; new campaign requests; projected supply; or projected demand.

Furthermore, in this process of leaving commitments intentionally abstract to be able to remap the inventory to accepted campaigns better to make profitable room for additional campaign requests, it does not have to be the scheduling aspects that are left uncommitted. Any aspects of a planned campaign can be declared to the buyer as commitments or left open so as to retain flexibility. For example, the optimizer may have in its plan that specific quantities of specific shows are going to be used to satisfy a campaign, but the buyer is only told some more high-level characterization of that set. For instance, instead of committing to the buyer that the specific planned baseball games will be allocated the buyer, the seller can commit to delivering "premium golf, premium basketball, or any yachting shows" to fulfill the campaign.

The system can be used to reoptimize the allocation in light of new campaign requests, changes in supply (and/or supply projections), and changes in demand projections (represented in the system, for example, via updated reserve prices or reserve campaigns).

Reoptimization may be essentially the same as the optimization described above, except that the campaigns have execution state, which affects what is the best way to fill them with what inventory going forward. For example, a campaign can have an amount delivered so far, which affects how much is still needed to satisfy the campaign commitment. Similarly, the campaign may have executed at a certain volume of advertisements per day so far, which affects how much per day is required and profitable to give to that campaign to satisfy the smoothness constraint that ties the past execution to the future execution.

As in the optimization, reoptimization may take the preferences into account from not only the new campaign requests but also from the previously accepted campaigns. In some embodiments some of those preferences may long be valid, such as some bonus offers that did not get accepted when the campaign was first accepted may no longer be considered to be on offer from the buyer. In the reoptimization, some existing campaigns may get remapped onto the inventory differently than they were mapped before.

Reoptimization can be initiated automatically (e.g., periodically or when supply and/or demand and/or execution state and/or campaign requests have changed sufficiently from projections or from a previous state) or manually.

In some embodiments, during or after implementation of the campaign 841, the media service provider may determine that it is unable, or will likely be unable, to satisfy (profitably or at all) all of the buyer's purchasing criteria 843. Examples of this may occur when a scheduled program is pre-empted by a news bulletin or by an earlier live program that ran over its scheduled time, or when a video-on-demand service failed to deliver the entire program due to a communication service error, or a show has been canceled, or the gross rating points (GRPs) which indicate viewership were lower than predicted. If so, then it may determine a make-good action and cause the make-good action to be automatically offered and/or provided to the buyer 845. An example of such an action is automatically allocating additional advertising unit inventory that has a value equivalent or higher than the failed part of the originally allocated inventory, and which also satisfies the buyer's criteria. In one embodiment, a reoptimization is initiated that optimizes the decisions of accepting campaign requests (if any) and scheduling existing campaigns and the newly-accepted campaigns, holistically to maximize revenue, taking into account the monetary loss from makegoods (which is typically the cost of giving away future inventory for free, but can be some other cost such as an explicit penalty payment or reputation cost). In other words, this is optimization of makegoods. This is done in light of the execution state of campaign, projected supply (inventory in the various inventory segments), and demand projections (if available).

In some embodiments, when the system develops an ad campaign, it may present one or more alternatives to a user for consideration. For example, the system may permit a user to specify, or it may automatically identify, an alternate criterion that is an alternate or supplement to at least one of the buyer's purchasing criteria. If so, it may use the temporal and non-temporal attributes in the data set to develop an alternative advertising campaign that satisfies the buyer's purchasing criteria as modified by the alternate criterion. It may then present the alternate campaign to the user for consideration and selection. Examples of such constraints may include undersell constraints that restrict the sale of ads for a particular media asset or slot or other unit of inventory within a media asset. Another example is an oversell constraint that permits assignment of conflicting advertising commitments for a particular media asset or slot or other unit of inventory within the media asset. If so, then the system may automatically generate a report to the media service provider that identifies any conflicting commitments.

The system also support various forms of sensitivity analysis. For example, the seller may be able to conduct sensitivity analysis using what-if analysis of changing sell-side constraints, preferences, and hard-wirings (which are actually a form of constraint), and then rerunning the optimizer to see how the revenue and allocation would change.

As another example, a user may be able to have the system perform a sensitivity analysis by forcing undersell (e.g., saving some inventory to be sold in the future). This tells the user the tradeoff between quantity left to be sold in the future (or used for other purposes such as self marketing) and revenue. This sensitivity analysis can be done by putting the undersell constraint overall, or on a per-inventory-segment basis, and to different extents.

As yet another example, a user may be able to have the system perform a sensitivity analysis by allowing oversell. This sensitivity analysis can be done by relaxing the supply constraints throughout on a per-inventory-segment basis, and to different extents. For one, this will tell the seller what inventory would be most valuable to have more of. The seller can use this information to generate or procure more content of those kinds. The system may then provide the seller with a report of each conflicting commitment resulting from the oversell. The report may include one or more characteristics of each campaign, such as revenue that it will generate, so that the seller can use the reported information to decide which campaign will win the conflict and which will be reallocated.

In some embodiments, the system may include a seller-side user interface as described above. The seller-side interface may permit a user to enter a modification to a presented advertising campaign. This can be used, for example, for manual (instead of optimized) sales. A manual/automated hybrid is another option here. The seller can, for example, use mainly manual sales in the beginning when most inventory still available, and automated packing of campaigns onto remaining inventory later on in the process when supply is tighter.

The seller might include campaign control constraints on behalf of the buyers, such as smoothness. The seller can include sellside constraints and preferences as in the sales+allocation setting. The seller could include other objectives as in the sales and allocation setting. The seller could do a what-if analysis as in the sales and allocation setting.

If the system develops an alternate campaign, it may present the alternate campaign to a user to review, accept, and/or request to modify.

In some embodiments, the methods and systems described in this document can be used in a mode where all campaign requests are available at the same time (i.e., a batch mode), or in a mode where campaign requests arrive over time and have to be awarded or rejected before all campaign requests have arrived (i.e., a dynamic mode). The sales tool can also be used as a sales support tool, where the buyers do not necessarily even know that the seller is entering the buyer's campaign requests into the system, and the system is making campaign suggestions to the seller's sales executives.

When per-advertising-unit pricing is discussed in this application, it can be based on any metric, such as number of slots, slot time, number of impressions, number of clicks, purchases, other viewer actions, and so on. All of these metrics can be weighted by quality. Furthermore, a combination of different metrics can be used in the system, and even within one campaign, e.g., I will pay $5 CPM plus $0.50 per click."

In some embodiments, the system and approach can also be used when there are multiple sellers, and a buyer's campaign can potentially runs across the inventories of the different sellers. One skilled in the art of mechanism design game theory will appreciate that there are a myriad of alternate ways to divide the revenue among the sellers. Those different mechanisms can have different impacts on the incentives of the participants in the system. Another factor that may be considered in the multi-seller setting is what happens if a campaign fails: i.e., which sellers are at fault and how (and how much) does each seller have to make good. One way that the system may handle this is to bilateralize all the campaigns or commitments so a multi-way commitment is split into multiple commitments between the buyer and one seller each. However, this removes some flexibility from reoptimization if one mandates that one can only reoptimize within each bilateral commitment.

Figure 9:
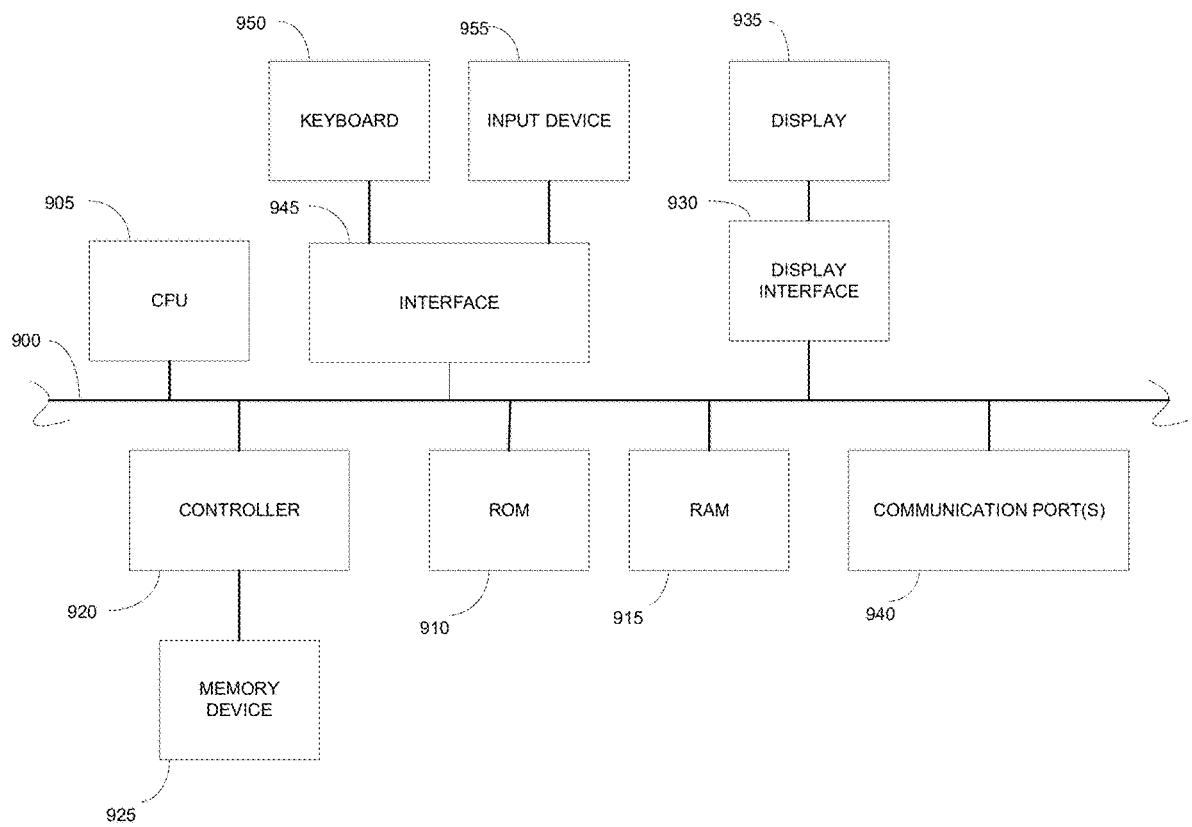
FIG. 9 is a block diagram representing internal hardware that may be used to contain or implement the various computer processes and systems discussed in this document.

FIG. 9 depicts an example of internal hardware that may be used to contain or implement the various computer processes and systems as discussed above. An electrical bus 900 serves as an information highway interconnecting the other illustrated components of the hardware. CPU 905 is a central processing unit of the system, performing calculations and logic operations required to execute a program. CPU 905, alone or in conjunction with one or more of the other elements disclosed in FIG. 9, is a processing device, computing device or processor as such terms are used within this disclosure. Read only memory (ROM) 910 and random access memory (RAM) 915 constitute examples of memory devices.

A controller 920 interfaces with one or more optional memory devices 925 that service as data storage facilities to the system bus 900. These memory devices 925 may include, for example, an external DVD drive or CD ROM drive, a hard drive, flash memory, a USB drive or another type of device that serves as a data storage facility. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

When used in this document, the term "processor" can refer to a single processor or to multiple processors that together implement various steps of a process. Similarly, a "memory device" or "database" can refer to a single device or databases or multiple devices or databases across which programming instructions and/or data are distributed.

A display interface 930 may permit information from the bus 900 to be displayed on the display 935 in audio, visual, graphic or alphanumeric format. Communication with external devices may occur using various communication ports 940. A communication port 940 may be attached to a communications network, such as the Internet, a local area network or a cellular telephone data network.

The hardware may also include an interface 945 which allows for receipt of data from input devices such as a keyboard 950 or other input device 955 such as a remote control, a pointing device, a video input device and/or an audio input device.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for managing a digital media campaign, comprising:
   a first data store comprising a plurality of digital media files, each of which corresponds to a digital advertisement that an electronic media service provider may present to consumers;
   a second data store containing an inventory of digital programming files, each of which corresponds to one or more digital programming assets;
   a set of programming data comprising temporal attributes and non-temporal attributes for a plurality of the digital programming files;
   a digital media server configured to access the first data store and transmit the digital programming files to a plurality of media presentation devices;
   a processor; and
   a computer-readable medium containing programming instructions that, when executed, cause the processor to implement a digital media campaign manager by:
      causing an electronic device to implement a buyer-side user interface that displays a plurality of sections that provide input fields for user-selectable purchasing criteria for placement of digital advertisements in one or more of the digital programming assets, wherein the instructions to present the buyer-side user interface that displays a plurality of user-selectable purchasing criteria comprise instructions to enable the first buyer to:

identify an overall time period for the advertising campaign;

define a time unit that is a subunit of the overall time period; and identify a smoothness criterion that represents a measurement of a maximum amount of, or a maximum change in a volume of, advertisements allocated to each of the time units for the advertising campaign, and receiving, via one or more of the input fields of the buyer-side user interface, a selection of one or more of the purchasing criteria for a purchase of digital advertisements by a first buyer, causing a display device to present a seller-side user interface that comprises sections that provide input fields for by which a seller may enter seller-side criteria for placement of digital advertisements in one or more of the digital programming assets, receiving, via the input fields of the seller-side user interface, a selection of one or more of the seller-side criteria for placement of digital advertisements in one or more of the digital programming assets, comparing the purchasing criteria and the seller-side criteria to the temporal attributes and non-temporal attributes in the data set to automatically develop an advertising campaign for the first buyer by:

selecting a group of digital advertisements for the campaign, selecting a group of the digital programming assets and automatically allocating the selected group of digital programming assets to the advertising campaign, along with scheduling parameters indicating when the selected digital advertisements will run within the digital programming assets in the selected group, so that the advertising campaign satisfies the selected purchasing criteria and the selected seller-side criteria; and automatically allocating the advertisements to spots in the advertising campaign so that any advertisements placed in digital programming assets that are scheduled television programs are allocated to the time units in a manner that does not violate the smoothness criterion, causing either the buyer-side user interface or the seller-side user interface to present indicia of the advertising campaign to either the first buyer or the seller to review; and after acceptance of the advertising campaign by either the first buyer or the seller, causing the digital media server to transmit the selected group of digital programming assets to a plurality of media presentation devices with the digital media files that will run according to the scheduling parameters.

2. The system of claim 1, wherein:

the instructions to present the buyer-side user interface that displays a plurality of user-selectable purchasing criteria comprise instructions to:

enable the first buyer to identify a start time, end time or duration for the advertising campaign, and enable the first buyer to identify a budget constraint for the advertising campaign; and the instructions to implement the digital media campaign manager comprise instructions to develop the advertising campaign so that it satisfies the budget constraint and the identified start time, end time or duration.

3. The system of claim 1, wherein the instructions to present the buyer-side user interface that displays a plurality of user-selectable purchasing criteria comprise instructions to enable the first buyer to:

identify a monetary value that the first buyer will pay if at least a portion of the selected purchasing criteria are met; and identify one or more alternative criteria for the campaign; and identify one or more different monetary values that the first buyer will pay if any of the alternative criteria are met.

4. The system of claim 3, wherein the instructions to present the buyer-side user interface that displays a plurality of user-selectable purchasing criteria comprise instructions to enable the first buyer to:

identify the different monetary values by expressing preferences over targeting, campaign control criteria or both.

5. The system of claim 1, wherein the received selection of one or more of the purchasing criteria comprises a target audience criterion that comprises at least one of the following:

a requirement that a viewer have purchased a specified good or service within a time period;

a requirement that a viewer have exhibited a viewing pattern over a time period;

a requirement that a viewer has publicly expressed positive feedback on a social network for a digital media asset in the advertising campaign; or a requirement that a viewer has not publicly expressed negative feedback on a social network for a digital media asset in the advertising campaign.

6. The system of claim 3, wherein:

at least one of the alternative criteria comprises an exclusivity preference that comprises:

an exclusive time period, and a competitive restriction for the placement of advertisements by a second buyer in one or more of the digital programming assets during the exclusive time period; and the instructions to automatically develop the advertising campaign comprise instructions to:

use the different monetary value for the exclusivity preference to determine whether satisfying the exclusivity preference will maximize a revenue opportunity for the media service provider, and if satisfying the exclusivity preference will maximize a revenue opportunity for media service provider, then develop an advertising campaign for the second buyer so that digital media assets of the second buyer are positioned in a manner that does not violate the exclusivity preference of the first buyer.

7. The system of claim 1, wherein:

the instructions to present the buyer-side user interface that displays a plurality of user-selectable purchasing criteria comprise instructions to enable the user to:

identify a separation criterion that comprises:

a user-specified type of advertisement, and a minimum distance that the advertising campaign should maintain between placement of the first buyer's advertisements and placement of advertisements of the user-specified type; and the instructions to automatically develop the advertising campaign comprise instructions to select a group of advertisements for the first buyer for the campaign and automatically allocate the first buyer's advertisements to spots in the campaign so that the first buyer's advertisements and placement of advertisements of the user-specified type are positioned in a manner that does not violate the separation criterion.

8. The system of claim 1, wherein the instructions to cause the display device to present the seller-side user interface comprise instructions to provide an input by which the seller-side user interface may receive from a user:
   a categorization of at least one of the purchasing criteria as a preference; and
   for at least one of the criteria that is categorized as a preference, a plurality of levels for the preference criterion and, for each level, a level-specific bonus amount that the first buyer will pay if the preference is satisfied in the advertising campaign.

9. The system of claim 1, wherein:
   the instructions to present the seller-side user interface comprise instructions to provide an input by which the seller-side user interface may receive from a user:
      a categorization of two or more of the purchasing criteria as preferences, and
      for each of the criteria that are categorized as a preference, a bonus amount that the first buyer will pay if the preference is satisfied in the advertising campaign; and
   the instructions to automatically develop the advertising campaign comprise instructions to develop the advertising campaign to satisfy at least one of the preferences that maximize a revenue opportunity for the media service provider.

10. The system of claim 9, wherein:
    the instructions to present the seller-side user interface also comprise instructions to provide an input by which the seller-side user interface may receive from a user a constraint on how the bonus amounts may be aggregated; and
    the instructions to automatically develop the advertising campaign comprise instructions to determine a cost for the advertising campaign that includes the bonus amounts as limited by the constraint.

11. The system of claim 1, wherein:
    the instructions to implement the digital media campaign manager also comprise instructions to receive a group of zones that constitute an interconnect for at least a portion of the advertising campaign;
    the instructions to automatically develop the advertising campaign comprise instructions to develop the portion of the advertising campaign so that whenever a slot is allocated to an interconnect, then present an ad running in that slot to all zones that constitute the interconnect.

12. The system of claim 1, wherein the instructions to cause the electronic device to implement the buyer-side user interface that displays the plurality of user-selectable purchasing criteria comprise instructions to:
    access a set of profile data for the first buyer;
    for at least one of the purchasing criteria, determine a recommended value for that purchasing criteria for the first buyer based on the profile data;
    include the recommended value in the campaign as a default value.

13. The system of claim 1, wherein the instructions to develop the advertising campaign comprise instructions to:
    identify a plurality of advertisements to include in the advertising campaign;
    for each of the advertisements, preliminarily assign the advertisement to a position in the advertising campaign, wherein the position comprises at least one of the following: a media asset or a temporal position; and
    present the advertising campaign to the first buyer with at least one advertising assignment presented as an unscheduled commitment for which the position will be assigned or confirmed after the first buyer accepts the advertising campaign.

14. The system of claim 13, wherein the instructions to assign each advertisement to a position comprise instructions to:
    determine that a plurality of candidate positions have attributes that meet each constraint in the first buyer's purchasing criteria;
    select, from the candidate positions, a group of position assignments that maximize a revenue opportunity for the media service provider while remaining within the budget criteria; and
    include the group of media assets and position assignments in the advertising campaign.

15. The system of claim 1, wherein:
    the instructions to cause the electronic device to implement the buyer-side user interface comprise instructions to provide an input by which the buyer-side user interface may receive from the first buyer a selection of at least one preferred slot within a pod of programming, along with a monetary value that the first buyer will pay if the campaign includes an advertisement in the preferred slot; and
    the instructions to implement the advertising campaign comprise instructions to:
       identify a plurality of advertisements to include in the advertising campaign,
       determine whether assigning an advertisement to the preferred slot will maximize a revenue opportunity for the media service provider, and
       when assigning an advertisement to the preferred slot will maximize a revenue opportunity for the media service provider, assigning an advertisement to a position that corresponds to the preferred slot.

16. The system of claim 1, wherein the instructions to develop the advertising campaign further comprise additional instructions to:
    receive a second set of purchasing criteria for a purchase of advertisements by a second buyer;
    use the second set of purchasing criteria and at least some of the attributes in the set of programming data to develop a second advertising campaign for the second buyer;
    determine that the first advertising campaign and the second advertising campaign would, if implemented, each place an advertisement in a common position;
    determine whether placing the advertisement from the first advertising campaign in the common position or placing the advertisement from the second advertising campaign in the common position will maximize a revenue opportunity for the media service provider; and
    place the advertisement from the advertising campaign that will maximize the revenue opportunity in the common position, and modify the other advertising campaign to identify a new position for the other advertising campaign's advertisement such that the new position will satisfy the purchasing criteria for the buyer of the other advertising campaign.

17. The system of claim 16, wherein the instructions to develop the first and second advertising campaigns further comprise additional instructions to reoptimize an allocation of inventory to each campaign in light of a new campaign request, a change in supply of inventory, or a change in demand projections.

18. The system of claim 1, wherein the instructions further comprise instructions that, when executed, cause the processor to, after the advertisement campaign has begun:
   determine that the media service provider was, or likely will be, unable to satisfy a purchasing criterion that was classified as a constraint;
   identify a make-good action that has a value that is appropriate to compensate the first buyer for the media service provider's inability to satisfy the purchasing criterion that was classified as a constraint; and
   automatically cause the make-good action to be offered or given to the first buyer or to a representative of the media service provider.

19. The system of claim 1, wherein the instructions to develop the advertising campaign comprise instructions to:
   identify a plurality of advertisements to include in the advertising campaign; and
   assign the advertisements to positions in a plurality of digital programming assets that comprise at least two of the following:
      a television program,
      an on-demand program that is distributed via an online audio/video distribution service,
      an electronic game,
      an electronic publication, or
      a web page.

20. The system of claim 1, wherein the instructions further comprise instructions that, when executed, cause the processor to, after presenting the indicia of the advertising campaign:
   receive a response comprising an acceptance of a first portion of the advertising campaign and a rejection of a second portion of the advertising campaign;
   determine an updated price for the first portion of the advertising campaign;
   modify the advertising campaign to exclude the second portion of the advertising campaign; and
   output the modified advertising campaign and the updated price via the buyer-side user interface and/or the seller-side user interface for review.

21. The system of claim 1, wherein the instructions to develop the advertising campaign also comprise instructions to:
   identify an alternate criterion, wherein the alternate criterion comprises an alternative or supplement to at least one of the purchasing criteria;
   use the temporal attributes and the non-temporal attributes in the data set to automatically develop an alternative advertising campaign for the first buyer that satisfies the purchasing criteria as modified by the alternate criterion; and
   present the alternative advertising campaign to the first buyer via the buyer-side user interface and/or the seller via the seller-side user interface.

22. The system of claim 1, wherein the instructions to develop the advertising campaign comprise instructions to:
   identify an undersell constraint, wherein the undersell constraint comprises a restriction on sale of advertisements for a particular media asset or other unit of inventory; and
   when automatically developing the advertising campaign, doing so such that the advertising campaign satisfies the undersell constraint.

23. The system of claim 1, wherein the instructions to develop the advertising campaign comprise instructions to:
   relax a supply constraint throughout a campaign on a per-inventory-segment basis; and
   reoptimize one or more campaigns based on the relaxing.

24. The system of claim 1, further comprising additional programming instructions that cause the processor to provide a property manager configured to:
   receive temporal attributes, non-temporal attributes or both for a new media asset; and
   add the received attributes for the new media asset to the set of programming data for use in future advertising campaigns.

25. The system of claim 1, wherein the seller-side criteria comprise one or more of the following:
   a premium value to be added to a bid or budget received from the first buyer;
   a requirement to provide the first buyer with an audience having one or more specified attributes; or
   a rule to factor a make-good cost in a revenue analysis when developing the advertising campaign.

26. The system of claim 1, wherein the instructions to implement the digital media campaign manager further comprise instructions that, when executed:
   cause a processor to receive a modification of the advertising campaign; and
   cause a processor to modify the advertising campaign to implement the received modification.

27. The system of claim 1, further comprising:
   a set of additional programming data comprising temporal attributes and non-temporal attributes for a plurality of digital media assets that a second media service provider will present to consumers; and
   wherein the instructions to develop the advertising campaign further comprise instructions to also use the parameters in the data set for the second media service provider so that the advertising campaign allocates advertisements to media assets for each of the media service providers.

28. The system of claim 1, further comprising additional programming instructions to:
   determine a first cost to reach a target audience using a first type of targeting for the placement of the digital advertisements in one or more of the digital programming assets;
   determine a second cost to reach the target audience using a second type of targeting, wherein the second type of targeting is broader or narrower than the first type of targeting; and
   cause the seller-side user interface or the buyer-side user interface to output the first and second costs for comparison.

* * * * *

UNITED STATES PATENT AND TRADEMARK OFFICE
CERTIFICATE OF CORRECTION

| | |
|---|---|
| PATENT NO. | : 11,102,545 B2 |
| APPLICATION NO. | : 15/814630 |
| DATED | : August 24, 2021 |
| INVENTOR(S) | : Tuomas W. Sandholm |

It is certified that error appears in the above-identified patent and that said Letters Patent is hereby corrected as shown below:

On the Title Page

Item (71) Applicant, please replace:
Optimized Markets, Inc., Pittsburgh, PA (US)

With:
Tuomas W. Sandholm, Pittsburgh, PA (US)

Signed and Sealed this
Seventeenth Day of September, 2024

Katherine Kelly Vidal
*Director of the United States Patent and Trademark Office*